United States Patent
Wakabayashi et al.

(10) Patent No.: US 6,358,035 B1
(45) Date of Patent: *Mar. 19, 2002

(54) DISK PRODUCING APPARATUS

(75) Inventors: Akira Wakabayashi; Yukiya Shimizu; Eiji Suzuki; Masayuki Kubota, all of Kanagawa (JP)

(73) Assignee: Fuji Photo Film Co., Ltd., Kanagawa (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/550,176

(22) Filed: Apr. 14, 2000

Related U.S. Application Data

(62) Division of application No. 09/342,896, filed on Jun. 29, 1999, now Pat. No. 6,136,261, which is a continuation of application No. 08/618,213, filed on Mar. 19, 1996, now abandoned.

(30) Foreign Application Priority Data

Mar. 20, 1995 (JP) ............................................. 7-61311

(51) Int. Cl.[7] .............................................. B29C 51/42
(52) U.S. Cl. .................... 425/301; 425/302.1; 425/384; 425/398
(58) Field of Search ................................ 425/289, 295, 425/301, 302.1, 384, 387.1, 388, 398

(56) References Cited

U.S. PATENT DOCUMENTS

| | | | |
|---|---|---|---|
| 3,263,011 A | 7/1966 | Jagger et al. ................ 264/153 |
| 3,466,355 A | 9/1969 | Kostur ........................ 264/163 |
| 3,484,518 A | 12/1969 | Ignell ......................... 264/322 |
| 3,597,799 A | * 8/1971 | Earle ........................... 425/388 |
| 3,868,209 A | * 2/1975 | Howell ........................ 425/388 |
| 3,887,321 A | * 6/1975 | Hijikata et al. ............. 425/388 |
| 3,962,392 A | * 6/1976 | Conner, Jr. ................. 425/388 |
| 4,032,281 A | * 6/1977 | Rakovsky .................... 425/384 |
| 4,423,943 A | 1/1984 | Gold ........................... 354/275 |
| 4,464,329 A | 8/1984 | Whiteside et al. ........ 425/302.1 |
| 4,663,094 A | 5/1987 | Buck et al. ................. 264/522 |
| 4,666,394 A | 5/1987 | Wakamiya et al. ......... 264/549 |
| 4,834,306 A | 5/1989 | Robertson et al. ......... 242/71.1 |
| 4,836,762 A | * 6/1989 | Davis, Jr. .................... 425/388 |

(List continued on next page.)

FOREIGN PATENT DOCUMENTS

| | | |
|---|---|---|
| GB | 2025302 | 1/1980 |
| JP | 61-51570 | 3/1986 |
| JP | 5-147606 | 6/1993 |
| JP | 6-67360 | 3/1994 |

OTHER PUBLICATIONS

Patent Abstracts of Japan, vol. 18, No. 309 (P–1753), Jun. 13, 1994, & JP A 06 067360 (Konica Corp) Mar. 11, 1994, *abstract.

Primary Examiner—James P. Mackey
(74) Attorney, Agent, or Firm—Sughrue Mion, PLLC

(57) ABSTRACT

A photo film cassette includes a spool core (13) on which photo film is wound in a form of a roll. A cassette shell (3, 4) contains the spool core in rotatable fashion. In each of a pair of disks (16, 17), a bearing hole (16a, 17a) is formed. The disks are secured to first and second ends of the spool core, and regulate edges of the photo film. To produce at least one kind of disk, a continuous sheet (27, 78, 88, 162, 171, 215) of thermoplastic synthetic resin is partially masked with a mask plate (48, 87, 160, 161, 170). A portion of the sheet emerging out of the mask plate is heated at temperature higher than a softening point of the sheet. The emerging portion is subjected to vacuum/air-pressure forming, so as to form a disk-like portion (20) in the sheet. The bearing hole and a contour of the disks is cut in the disk-like portion, to produce the disks.

30 Claims, 26 Drawing Sheets

U.S. PATENT DOCUMENTS

| | | | |
|---|---|---|---|
| 4,844,852 A | 7/1989 | Keyser et al. | 264/153 |
| 4,848,693 A | 7/1989 | Robertson | 242/71.1 |
| 5,031,852 A | 7/1991 | Dowling et al. | 242/71.1 |
| 5,111,723 A | 5/1992 | Andrusch et al. | 83/24 |
| 5,211,348 A | 5/1993 | Enomoto | 242/71.1 |
| 5,271,577 A | 12/1993 | Takahashi et al. | 242/71.16 |
| 5,322,649 A | 6/1994 | Rheinish et al. | 264/2.7 |
| 5,407,146 A | 4/1995 | Takahashi et al. | 242/348 |
| 5,437,828 A | 8/1995 | Shimizu et al. | 264/163 |
| 5,620,715 A * | 4/1997 | Hart et al. | 425/384 |
| 5,633,022 A | 5/1997 | Myers | 264/522 |

* cited by examiner

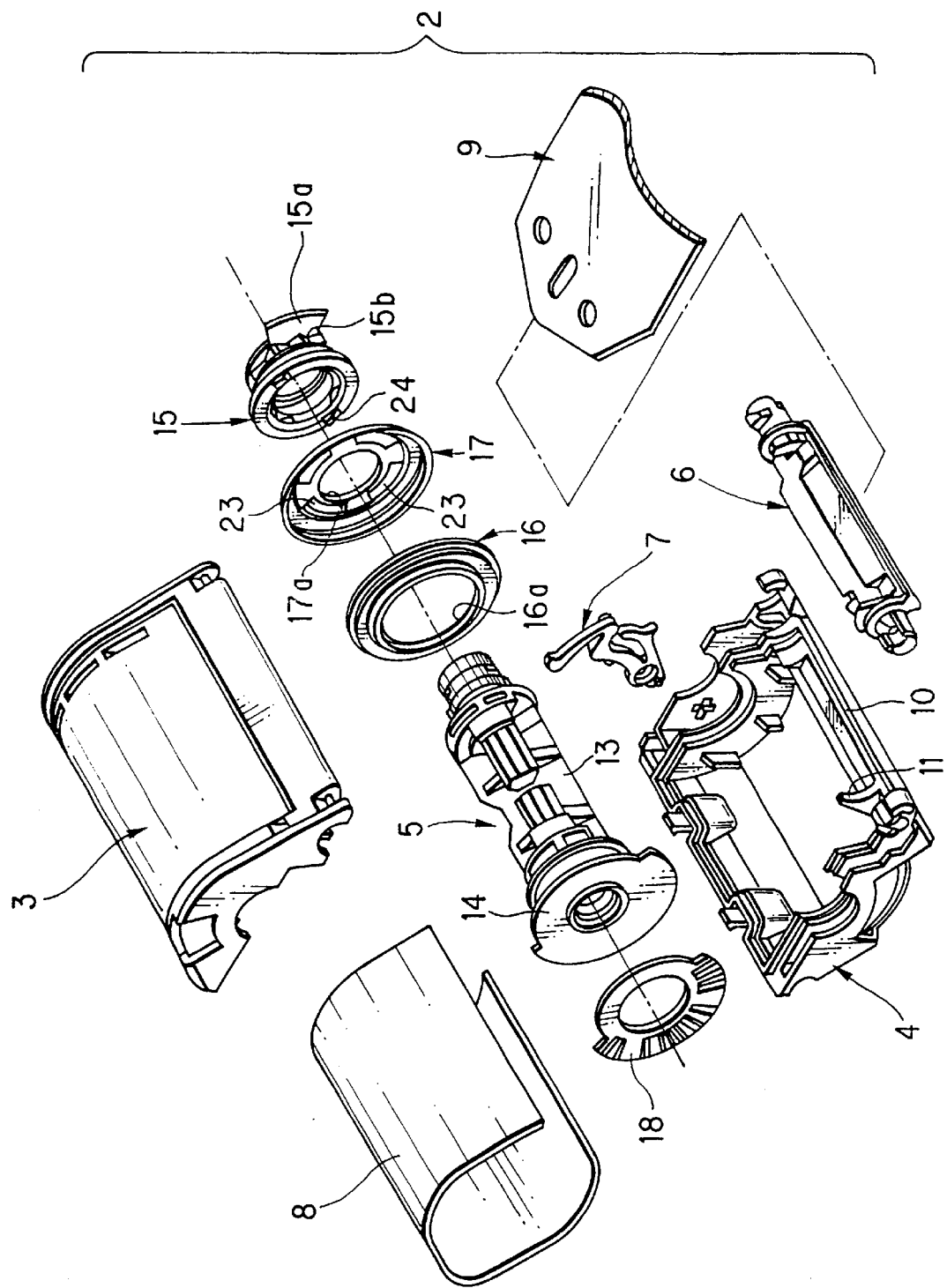

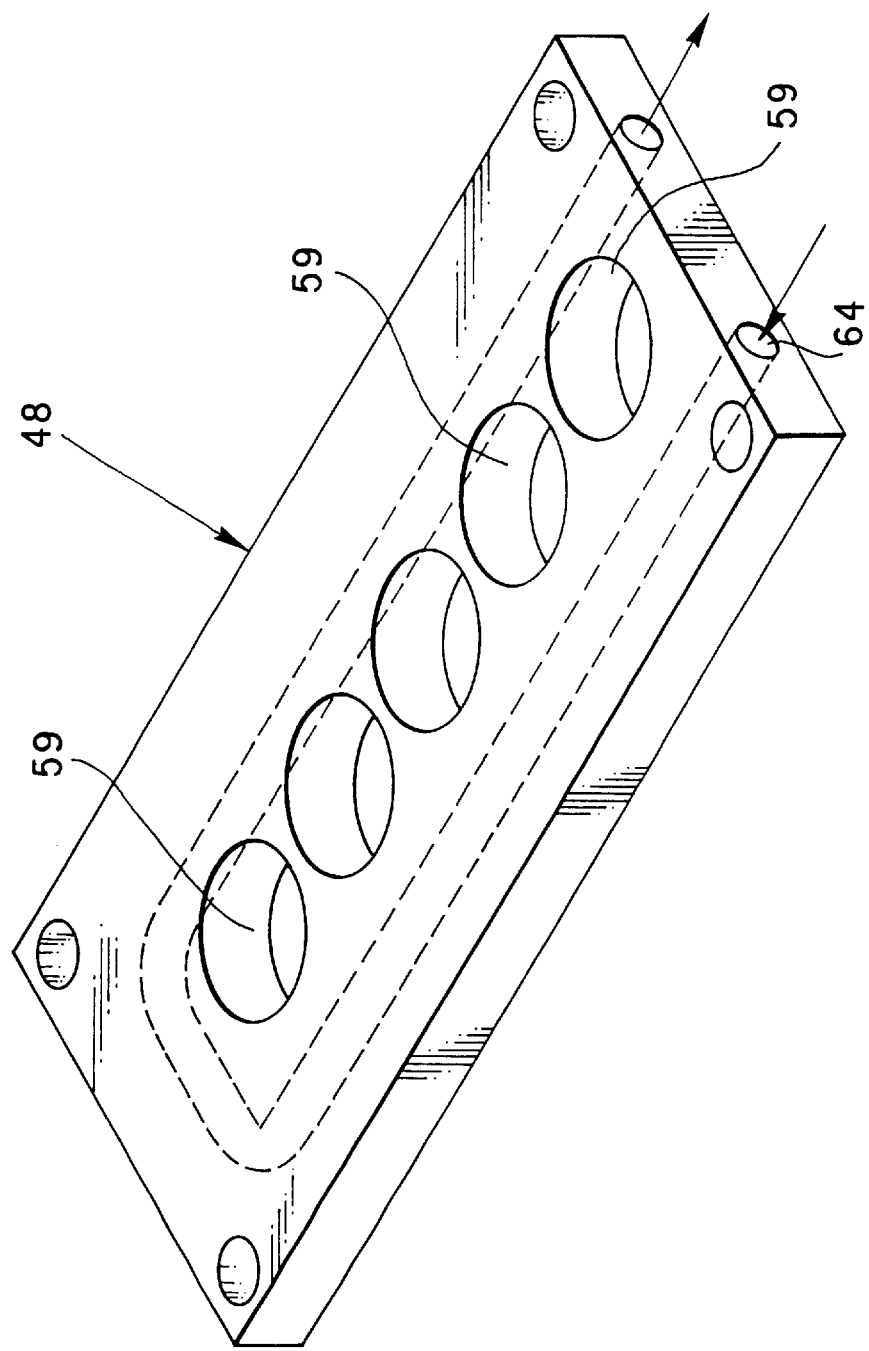
F I G. 5

F I G. 14
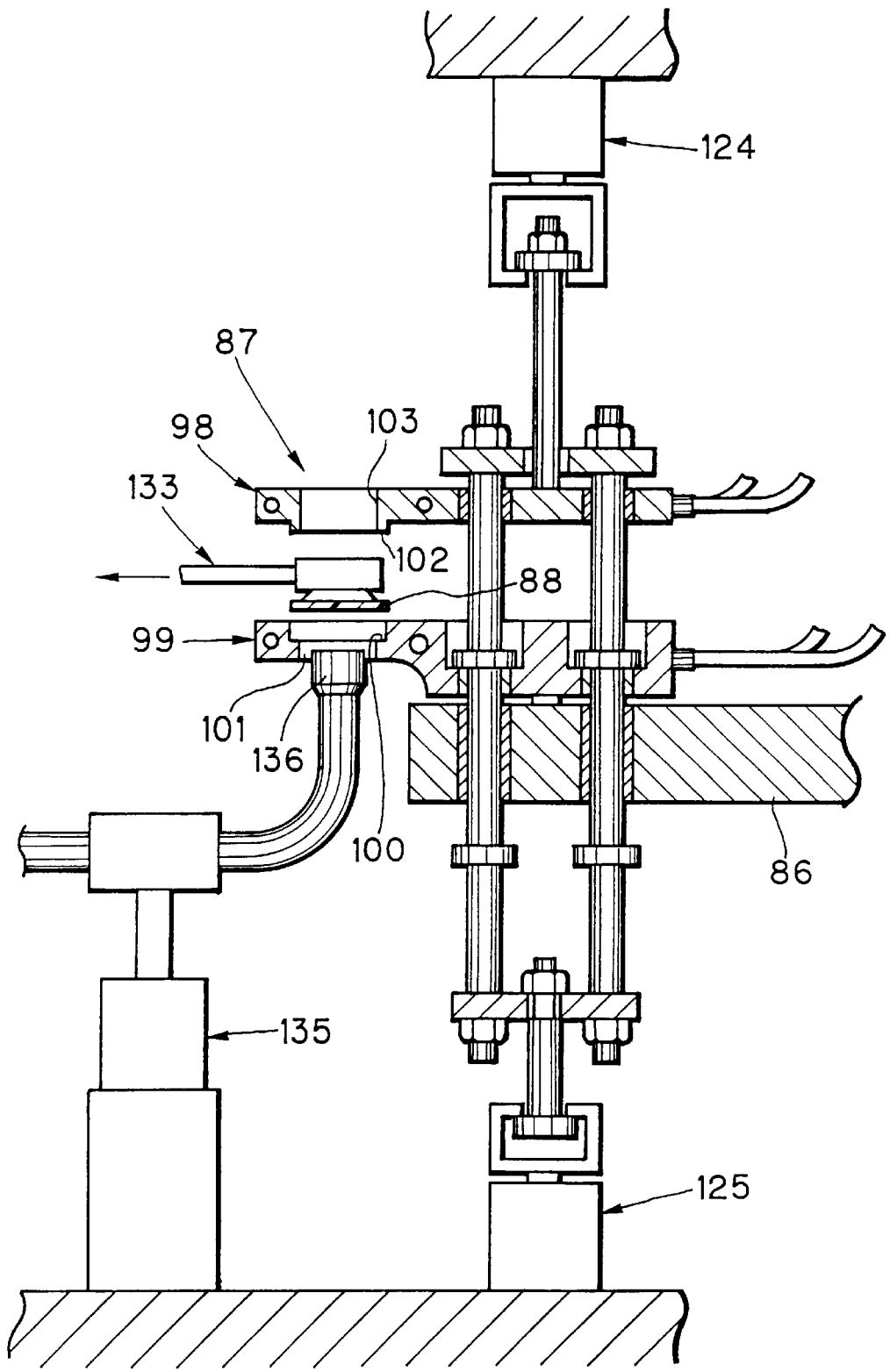

DISK PRODUCING APPARATUS

This is a divisional of application Ser. No. 09/342,896 filed Jun. 29, 1999 (now U.S. Pat. No. 6,136,261 issued Oct. 24, 2000), which is a continuation of abandoned U.S. application Ser. No. 08/618,213 filed Mar. 19, 1996, the disclosure of which is incorporated herein by reference.

BACKGROUND OF THE INVENTION

1. Field of the Invention

The present invention relates to a disk producing method and apparatus for a photo film cassette. More particularly, the present invention relates to a method and apparatus for producing a plastic disk with high quality to be used in a photo film cassette.

2. Description Related to the Prior Art

U.S. Pat. No. 4,423,943 discloses a type of photo film cassette, of which a leader of unexposed photo film is precontained in the cassette shell, and advanced to an outside of the cassette shell when a spool is rotated in an unwinding direction. The spool is constituted by a spool core and two disks, which are disposed on the spool core, for contact with the ends of a roll of the photo film, to render the turns of the photo film neat. In the cassette of the leader-advancing type, it is necessary to transmit rotation of the spool to the roll of the photo film. To this end, the disks of the spool are provided with respective ring-like lips formed on their periphery and projected toward one another. The ring-like lips are located to cover edges of the outermost turn of the photo film, and prevent the roll from being loosened. Such a cassette is suggested in U.S. Pat. Nos. 4,834,306, 4,848,693 (corresponding to JP-A 2-18545), U.S. Pat. No. 5,031,852 (corresponding to JP-A 3-214153), U.S. Pat. No. 5,271,577 (corresponding to JP-A 3-37645), and U.S. Pat. No. 5,407,146 (corresponding to JP-A 3-37645).

To advance the leader of the photo film, it is necessary to spread both disks in the vicinity of a photo film passageway, to release the ring-like lips from regulation. The disks are rotatable, and are not rotated without being deformed. The disks are formed at the thickness of 0.3 mm or less.

There is a suggestion of a disk producing method in U.S. Pat. No. 5,211,348 (corresponding to JP-A 4-251841 and 5-119436). Continuous resin sheet of a thermoplastic type having small thickness is heated. The continuous sheet is deformed in accordance with the vacuum forming. The continuous sheet is moved into a punch/die set, where a punch device and a die device cut a circular contour and a bearing hole at each disk-like portion, to form the disks. However a shortcoming lies in that, when one or both surfaces of thin resin continuous sheet are heated by a heater, the continuous sheet is likely to be softened excessively, melted and stuck on the heater, and cut down. JP-A 5-147606 has a suggestion for overcoming the shortcoming, and discloses a use of a mask plate having openings respectively greater than the contour of each disk to produce. The continuous sheet is masked by the mask plate. Portions emerging through the openings are heated. The portion excluded from the heating is cooled. The continuous sheet is subjected to the press molding. It is thus possible to reduce the extent of melting of the continuous sheet in the heater.

The synthetic resin for disks must have strong characteristics with resistance to heat and flexural fatigue resistance, and are obliged to be expensive. If the number of produced disks per unit amount of the continuous sheet is low, disks become costly. JP-A 6-67360 has a suggestion for solving this problem, and discloses that disks are produced from continuous sheet with a great width in an arrangement of a zigzag or a grid.

The disks must rotate without eccentricity in the cassette before the photo film can be advanced properly. Concentricity of the disks between the ring-like lips and the bearing holes should be acceptably high. The concentricity between the ring-like lip and the bearing hole depends on coincidence between a position of the continuous sheet for the vacuum forming, and a stop position of the continuous sheet for the punching. Also, concentricity between the bearing hole and the disk contour should be high. JP-A 61-51570 has a suggestion for obtaining high concentricity, and discloses forming positioning holes in the continuous sheet. Positioning pins are inserted in the positioning holes, while the vacuum forming is effected and while the punching is effected.

To produce disks with precision, the continuous sheet subjected to the vacuum forming must be conveyed properly to a set position of a punching machine. For conveyance of continuous sheet or other similar material, conveying rollers, which are rotatable with the continuous sheet nipped, are widely used. Small changes in the set position are likely to occur due to play of the rollers when the continuous sheet is stopped by stopping the rollers. JP-A 5-147606, in view of this, discloses conveying holes formed near to edges of the continuous sheet. Conveying pins are inserted in the conveying holes, and moved intermittently as far as a predetermined amount, to convey the continuous sheet to the set position regularly.

So far the vacuum forming in general has been used for producing articles not requiring high precision in size, such as vessels for edibles. There have been no successful techniques known in the art, for producing a disk with precision by the vacuum forming to be used in a photo film cassette.

JP-A 5-147606 has a problem in that wrinkles are created in the continuous sheet in the course of the press molding, because a cooled portion of the continuous sheet is also pulled during the molding. JP-A 6-67360 in turn has a problem in difficulties in heating and forming the wide continuous sheet with high regularity. Disks as produced have considerably varied physical characteristics.

In JP-A 61-51570, the positioning holes operate to fix the continuous sheet completely. When distortion occurs in the continuous sheet due to unevenness in the vacuum forming to change the size of the continuous sheet, the continuous sheet as distorted is punched in the punching step. Irregularity in sizes occurs between disks as products. The positioning holes and the conveying holes may be formed at the time of the vacuum forming. It is however likely that a punch and a die for cutting those holes are swollen by heat remaining in the continuous sheet imported in the vacuum forming. Precision of the punch and the die sizes is therefore lowered.

SUMMARY OF THE INVENTION

In view of the foregoing problems, an object of the present invention is to provide a method and apparatus for producing a plastic disk from a sheet without creating wrinkles in the sheet.

Another object of the present invention is to provide a method and apparatus for producing a plastic disk with high precision and regularity to be used in a photo film cassette.

In order to achieve the above and other objects and advantages of this invention, a sheet of thermoplastic synthetic resin is partially masked with a mask plate. A portion of the sheet emerging out of the mask plate is heated at temperature higher than a softening point of the sheet. The emerging portion is subjected to vacuum forming, air-pressure forming, or vacuum/air-pressure forming in combination of vacuum forming and air-pressure forming, so as to form a disk-like portion in the sheet. The bearing hole and a contour of the disks is cut in the disk-like portion, to produce the disks.

In a preferred embodiment, at least one opening is formed through the mask device and having a size greater than the disks, the emerging portion emerging to be heated by the sheet heating unit while the sheet is accessed by the mask device.

The mask heating device heats a mask device at the temperature 10–50° C. lower than the softening point of the sheet.

In the present invention, the disk can be produced from a sheet without creating wrinkles in the sheet.

In a variant of disk producing apparatus, the sheet has a predetermined size. A sheet supply unit, a sheet heating unit, a forming unit and a punching unit are arranged along one arc. An index table is disposed at a center of arrangement of the sheet supply unit, the sheet heating unit, the forming unit and the punching unit, the sheet being mounted on the index table, the index table being rotated intermittently, for passing the sheet through the sheet supply unit, the sheet heating unit, the forming unit and the punching unit.

In another preferred embodiment, a retainable portion is formed in the sheet and near to an edge thereof when the disk-like portion is formed. The retainable portion of the sheet located in a conveying path is retained. The retainable portion while retained is moved in one direction within a predetermined range, so as to convey the sheet intermittently.

A positioning portion associated respectively with the disk-like portion is formed when the disk-like portion is formed. The sheet is positioned with the positioning portion, in cutting the bearing hole and the contour of the disks.

Furthermore, at least one first bend slit is cut in an outside of the disk-like portion to extend along part of a periphery thereof, the first bend slit rendering a position of the disk-like portion adjustable minutely relative to the sheet.

The disk can be produced with high precision and regularity to be used in a photo film cassette.

BRIEF DESCRIPTION OF THE DRAWINGS

The above objects and advantages of the present invention will become more apparent from the following detailed description when read in connection with the accompanying drawings, in which:

FIG. 1 is an exploded perspective illustrating a photo film cassette;

FIG. 5 is a perspective illustrating a mask plate;

FIG. 14 is a section illustrating the one sheet holder while a sheet is supplied;

DETAILED DESCRIPTION OF THE PREFERRED EMBODIMENT(S) OF THE PRESENT INVENTION

Figure 2A:
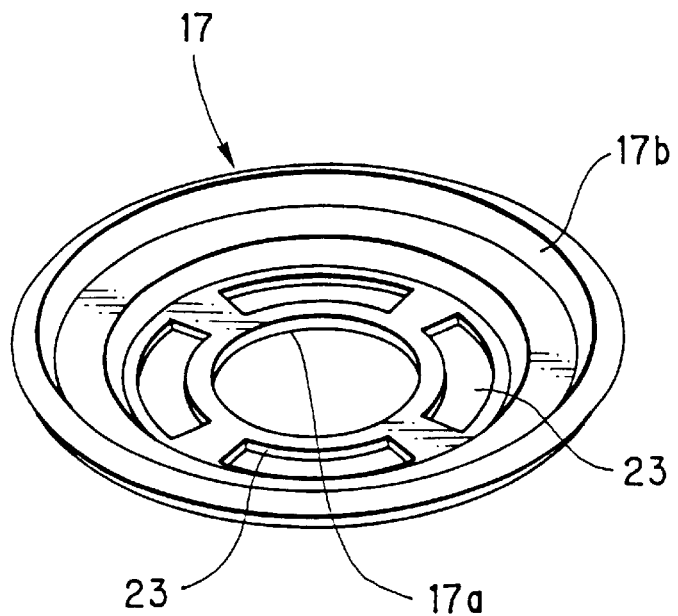
FIGS. 2A and 2B are a perspective and a section both illustrating a disk.

In FIG. 1, a photo film cassette 2 includes upper and lower shell halves 3 and 4, a spool 5, a port shutter member 6, a lock 7, and a sticker or label 8. The shell halves 3 and 4 are respectively formed from plastics. The spool 5 is contained between the shell halves 3 and 4. The sticker 8 is attached to the outside of the shell halves 3 and 4.

A photo film port 10 is formed between the shell halves 3 and 4 for passage of photo film 9. The port shutter 6 for opening/closing the photo film port 10 is contained in a middle position of the photo film port 10. A separating claw 11 is formed on the lower shell half 4 in an innermost position of the photo film port 10, for separation of a leader of the photo film 9 around the spool 5 from the roll, to direct it to the photo film port 10.

The spool 5 includes a spool core 13, a data plate 14, a barrel member 15, and disks 16 and 17. A trailer of the photo film 9 is secured to the spool core 13 and wound thereabout. The data plate 14 is formed with a distal end of the spool core 13. The barrel member 15 is secured to another distal end of the spool core 13. The disks 16 and 17 are secured to the spool core 13 between the data plate 14 and the barrel member 15. There is a bar code sticker 18 on which a bar code is printed for representing various data related to the photo film 9, and which is attached to the data plate 14. The bar code is read by a camera or other devices.

The barrel member 15 includes an indicator plate 15a for indicating a status of exposing the photo film 9 in externally visible fashion to a user, and a gear 15b for locking the spool 5. The indicator plate 15a is positioned inside any of a plurality of indicating windows formed in an end face of the shell halves 3 and 4, and shows one of unexposed, partially exposed, all exposed and developed statuses as information associated with each of the windows. When the port shutter 6 has a closed position, the gear 15b is engaged with the lock 7, which disables the spool 5 from rotating. When the port shutter 6 has an open position, the lock 7 is moved away from the gear 15b to enable the spool 5 to rotate.

The disks 16 and 17 are shaped like a two-stepped dish and have respective bearing holes 16a and 17a through which the spool core 13 is inserted. Around the disks 16 and 17 are formed ring-like lips 16b and 17b, which cover ends of a roll of the photo film 9 about the spool core 13, to keep the roll from being loosened in the photo film cassette 2. The disks 16 and 17 are formed of flexible plastics for easy deformation during advancement of the photo film 9, and have thickness of 0.3 mm or less.

Figure 2B:
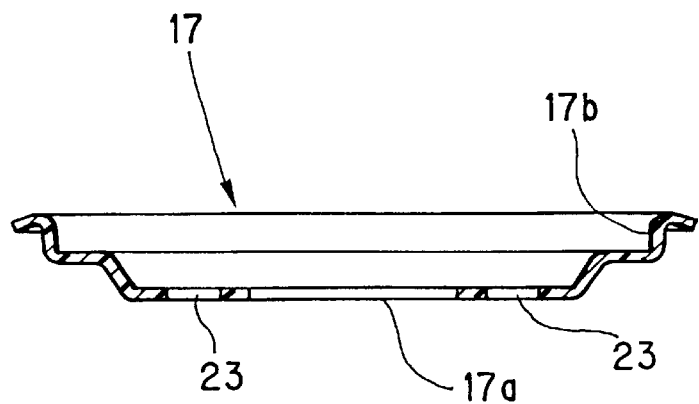

In FIGS. 2A and 2B, four slots 23 in an arc shape are formed around the bearing hole 17a in the disk 17. An inner face of the barrel member 15 is provided with ratchet claws 24, which are inserted in two of the slots 23. When the spool 5 is rotated in an unwinding direction, the ratchet claws 24 are engaged with the slots 23, to rotate the disk 17 with the spool core 13. When the spool 5 is rotated in a winding direction in reverse, the ratchet claws 24 rotate past the slots 23, not to transmit rotation of the spool core 13 to the disk 17.

Transmission of rotation to the disk 17 is changed over according to a direction of rotating the spool 5. Friction is reduced by coincidence in rotation between the photo film 9 and the disk 17 about the spool 5 in advancement of the photo film 9. Only small force applied to the spool 5 for rotation is required for advancement of the photo film 9. As the disk 17 is rotated individually in rewinding of the photo film, the photo film 9 is wound toward the inside of the ring-like lip 17b without hindrance.

Before and after use of the photo film cassette 2, the leader of the photo film 9 is entirely wound in the photo film cassette 2. The port shutter 6 has the closed position to close the photo film port 10. No ambient light comes into the photo film cassette 2 through the photo film port 10. The spool 5 is locked by the lock 7 and kept from accidentally rotating. When the port shutter 6 opens the separating claw 11 and the spool 5 is rotated in the clockwise direction, the leader of the photo film 9 is separated by the separating claw 11 to exit through the photo film port 10.

Figure 3:
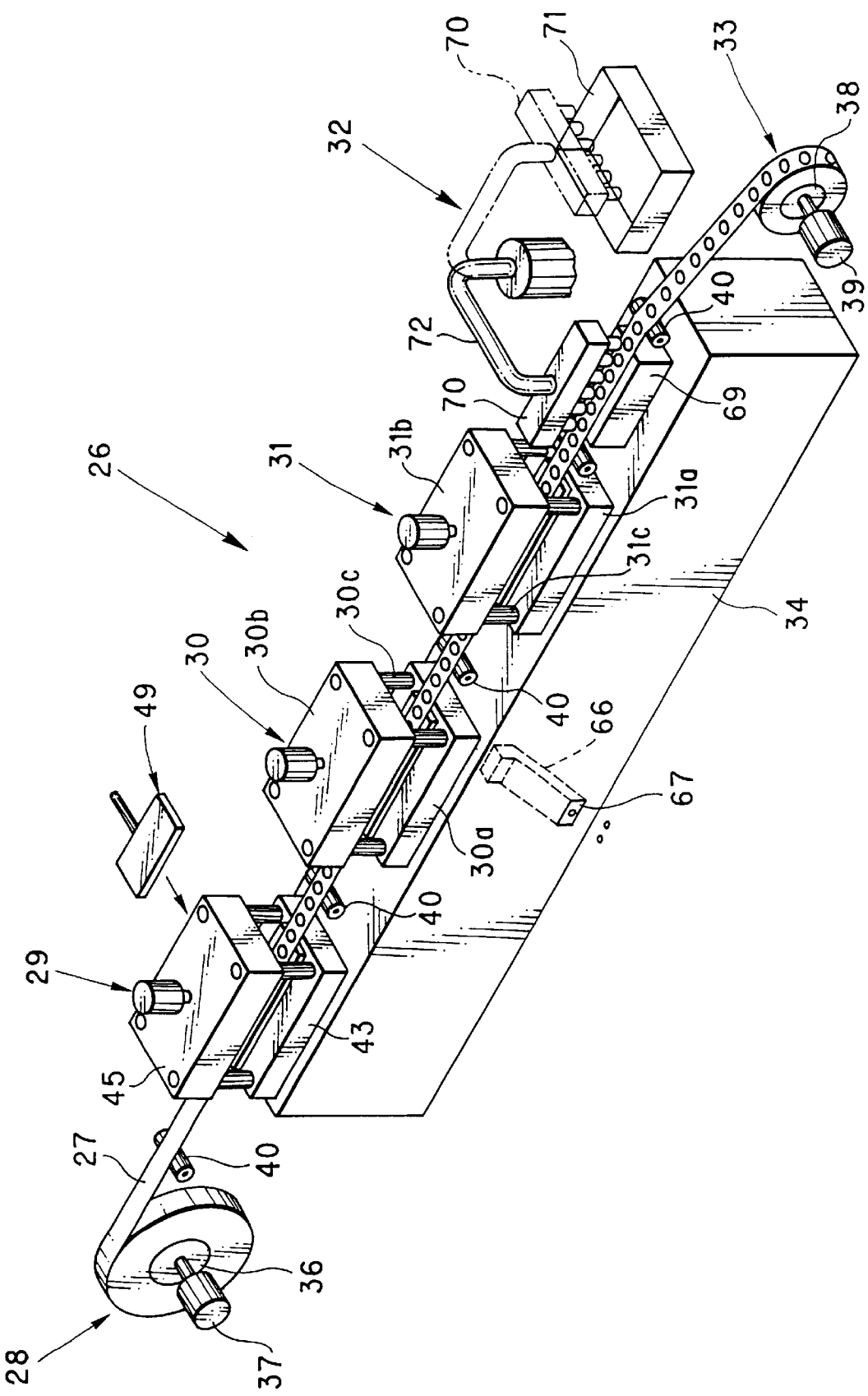
FIG. 3 is a perspective illustrating a disk producing apparatus.

A disk producing apparatus 26 of the present invention is described next. As illustrated in FIG. 3, the disk producing apparatus 26 is adapted to produce the disks 17. The disk producing apparatus 26 includes a sheet supply unit 28, a forming unit 29, a first punching unit 30, a second punching unit 31, a disk withdrawing unit 32 and a sheet winding unit 33, all of which are arranged on a stand 34. The sheet supply unit 28 supplies continuous sheet 27 of thermoplastic resin as material for the disks 17. The forming unit 29 applies heat to the continuous sheet 27 from the sheet supply unit 28, subjects the continuous sheet 27 to the vacuum/air-pressure forming, and forms plural disk-like portions, for example five (5) disk-like portions on the continuous sheet 27. The first punching unit 30 cuts the bearing hole 17a and the slots 23 in the disk-like portions. The second punching unit 31 cuts the contour of the disks 17 at the disk-like portions. The disk withdrawing unit 32 withdraws the continuous sheet 27 from the disk producing apparatus 26. The sheet winding unit 33 draws the continuous sheet 27 from the sheet supply unit 28, while winding the continuous sheet 27 subsequent to the punching of the disks 17.

The continuous sheet 27 is 0.15 mm thick, and formed of resin of polystyrene-modified polyphenylene ether with elastomer added thereto. The ratio of polystyrene and polyphenylene ether is 3:7. The proportion of elastomer is 12 wt. %.

The sheet supply unit 28 is constituted by a drum 36 and a brake device 37. The continuous sheet 27 is wound on the drum 36. The brake device 37 applies load to the drum 36 to apply tension to the continuous sheet 27 while drawn by the sheet winding unit 33. The sheet winding unit 33 is constituted by a drum 38 and a motor 39. The drum 38 is adapted to winding the continuous sheet 27 as punched. The motor 39 rotates the drum 38. To guide the continuous sheet 27, guide rollers 40 are disposed in the disk producing apparatus 26 between the sheet supply unit 28, the forming unit 29, the first punching unit 30, the second punching unit 31, the disk withdrawing unit 32 and the sheet winding unit 33.

Figure 4:
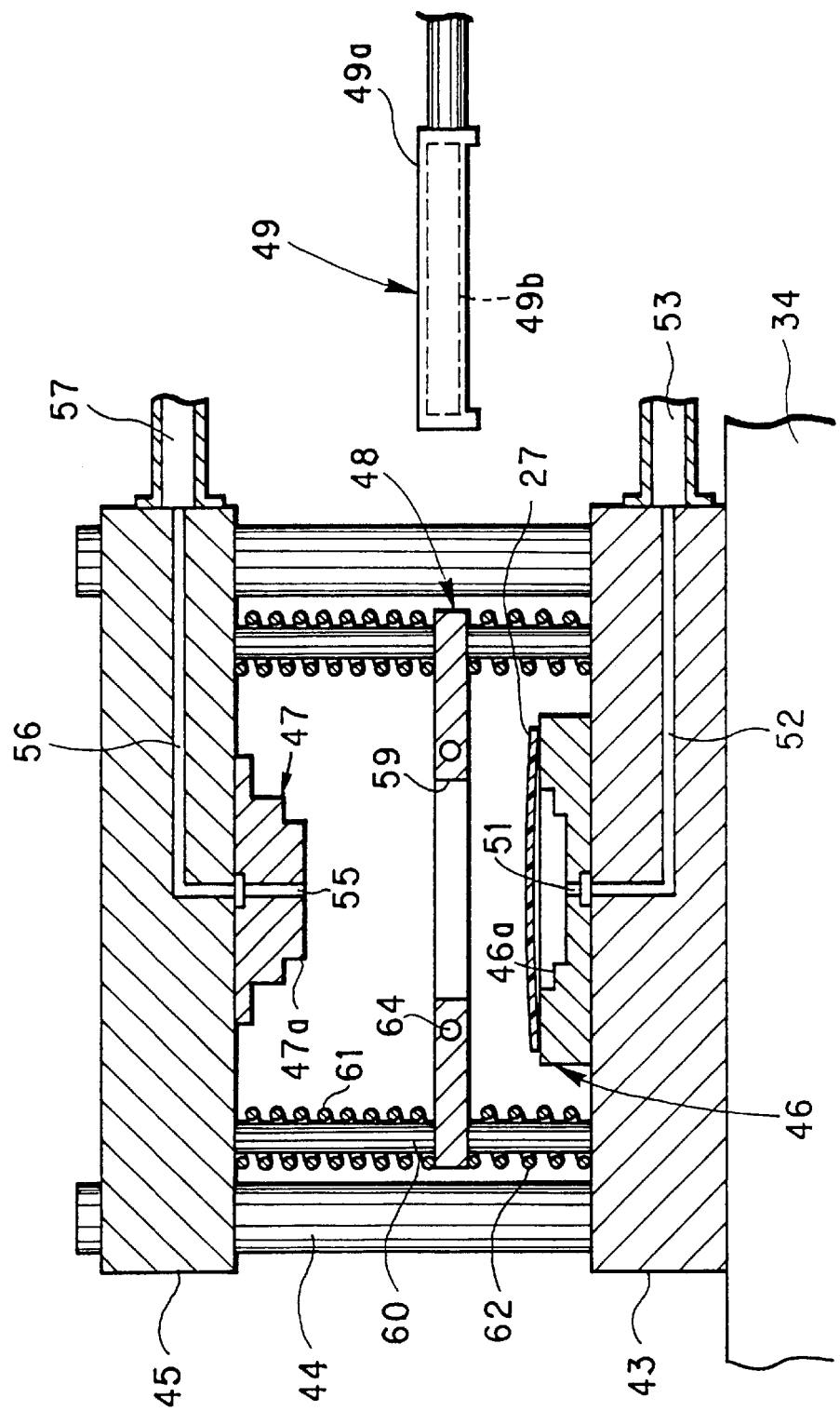
FIG. 4 is a section illustrating a vacuum/air-pressure forming unit.

In the forming unit 29, a stationary support 43 is disposed on the stand 34 as illustrated in FIG. 4. A movable support 45 is arranged over the stationary support 43, and movable vertically along guide shafts 44. A female mold plate 46 is mounted on the stationary support 43, and includes five (5) female molds 46a aligned in the conveying direction of the continuous sheet 27. A male mold plate 47 is mounted on the movable support 45, and includes five (5) male molds 47a.

There is a mask plate 48 disposed between the supports 43 and 45 for holding the continuous sheet 27 between it and the female mold plate 46. The forming unit 29 also has an apparatus for heating the sheet. A sheet heater 49 is disposed beside the forming unit 29, to be inserted between the supports 43 and 45. To move the movable support 45 up and down, hydraulic cylinders, cams, and the like are used.

There is an air mouthpiece 51 formed in the female mold plate 46 to come through each of the female molds 46a. The air mouthpiece 51 is connected to an air passageway 52 which is formed through the stationary support 43 and comes to be open in a lateral face of the stationary support 43. A pipe 53 is secured to the stationary support 43 to connect the air passageway 52 to a vacuum pump for air suction. There is an air mouthpiece 55 formed in the male mold plate 47 to come through each of the male molds 47a. The air mouthpiece 55 is connected to an air passageway 56 which is formed through the movable support 45 and comes to be open in a lateral face of the movable support 45. A pipe 57 is secured to the movable support 45 to connect the air passageway 56 to a compressor for air pressurization. The air suction and the air pressurization keep the continuous sheet 27 into tight contact with the female molds 46a, to form disk-like portions.

The mask plate 48 is rectangular as illustrated in FIG. 5, and has five (5) openings 59 formed through it and arranged at a regular interval in its longitudinal direction. The openings 59 have a diameter greater than a diameter of the disks 17. As illustrated in FIG. 4, the mask plate 48 is movable up and down in the vertical direction along guide shafts 60, which are disposed in positions inside positions of the guide shafts 44 for the movable support 45. There is a spring 61 having greater biasing force, arranged between the movable support 45 and the mask plate 48 and around each of the guide shafts 60. There is a spring 62 having smaller biasing force than the spring 61, arranged between the stationary support 43 and the mask plate 48 and around each of the guide shafts 60. With the springs 61 and 62 balanced, the mask plate 48 when not in use has a position nearer to the stationary support 43 and shiftable between the supports 43 and 45.

Figure 6:
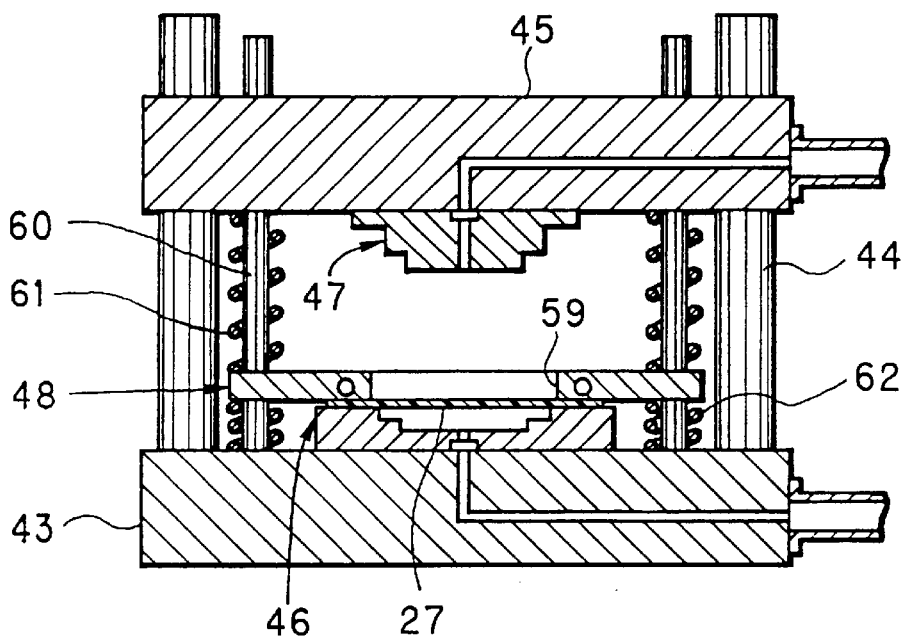
FIG. 6 is a section illustrating the forming unit while the sheet is squeezed.

The continuous sheet 27 is conveyed between the female mold plate 46 and the mask plate 48 lying over the same. Once the continuous sheet 27 stops being conveyed, the movable support 45 is lowered by the hydraulic cylinders, the cams, and the like at a small amount as illustrated in FIG. 6. The spring 61 over the mask plate 48 is pressed, to bias the mask plate 48 downwards along the guide shafts 60. The spring 62 under the mask plate 48 is weaker than the spring 61, and are compressed by the mask plate 48, to squeeze the continuous sheet 27 between the mask plate 48 and the female mold plate 46.

Figure 7:
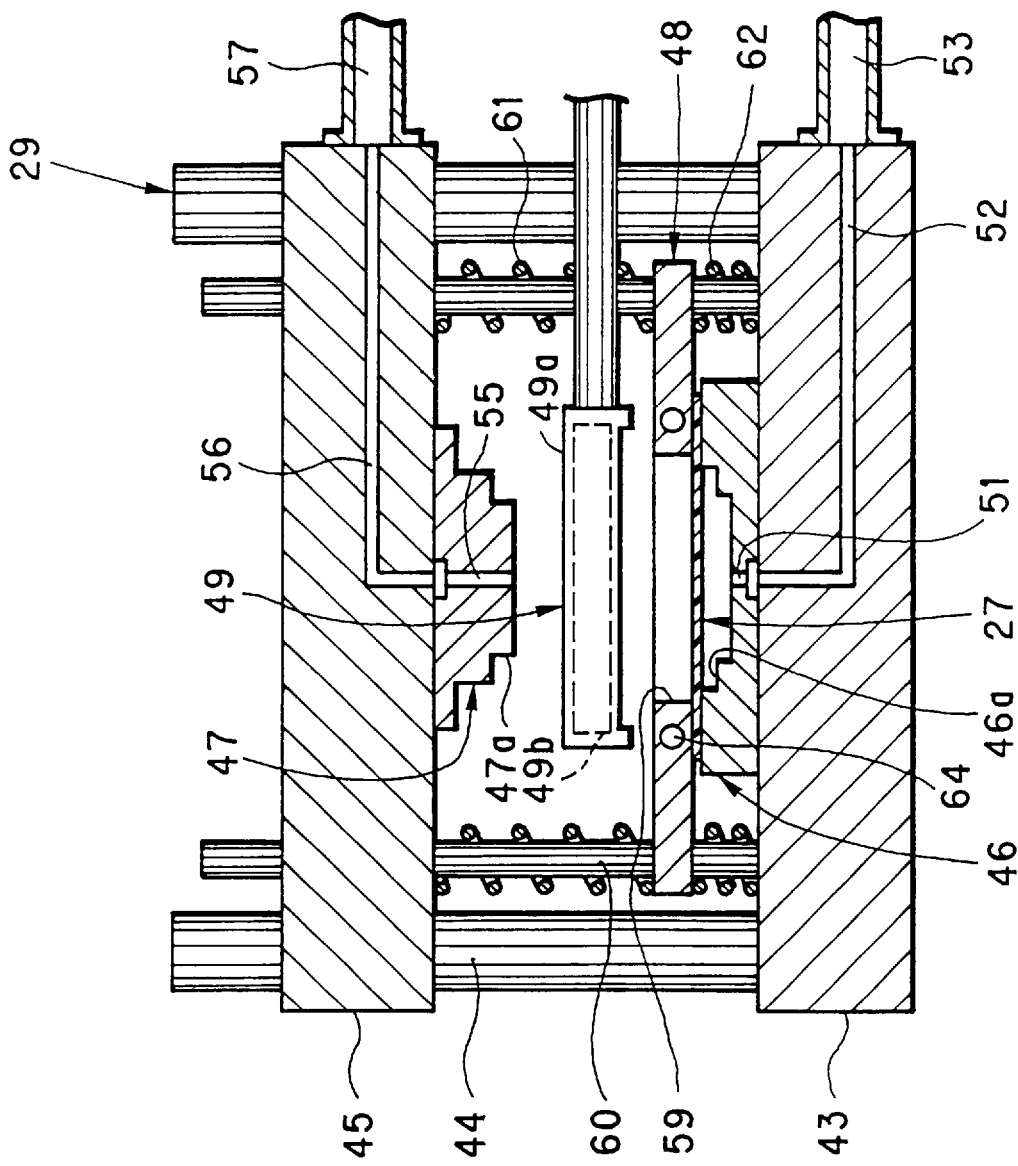
FIG. 7 is a section illustrating the forming unit while the sheet is heated.

When the continuous sheet 27 is inserted between the female mold plate 46 and the mask plate 48, the sheet heater 49 standing by beside the forming unit 29 is driven by an air cylinder or solenoid, and inserted between the movable support 45 and the mask plate 48 as illustrated in FIG. 7. The sheet heater 49 includes a block 49a and a cartridge heater 49b. The block 49a is formed of material with high heat conductivity, such as iron or aluminum. The cartridge heater 49b is incorporated in the block 49a. The sheet heater 49 is controlled so that a surface of the block 49a has temperature of 400±5° C. Heat of the sheet heater 49 operates to portions of the continuous sheet 27 emerging through the openings 59 in the mask plate 48, to render the portions as hot as 150° C.

When the continuous sheet 27 is heated to a predetermined temperature, the sheet heater 49 is moved aside and out of the forming unit 29 by the air cylinder or solenoid. Only the portions of the continuous sheet 27 required in the vacuum/air-pressure forming are heated, so that the continuous sheet 27 is not melted or stuck on the mold set in irrecoverable fashion. The continuous sheet 27 finishes being heated when its temperature as measured comes up to a predetermined value. It is also possible to measure preheating time experimentally for heating the continuous sheet 27 with the sheet heater 49, and to retract the sheet heater 49 upon the lapse of the measured time.

As illustrated in FIG. 5, an inside of the mask plate 48 has a liquid passageway 64, through which hot liquid medium, such as water or specialty oil for applying heat, is circulated inside the mask plate 48. The liquid passageway 64 is disposed around the openings 59. The hot liquid medium is entered into one end of the liquid passageway 64, flows through the liquid passageway 64 to heat the mask plate 48 to the temperature 10–50° C. lower than a softening point of the continuous sheet 27, and exited from another end of the liquid passageway 64 to the outside. Thus the portion of the continuous sheet 27 masked by the mask plate 48 is heated to the temperature lower than its softening point, and can be swelled at a smaller amount at the time of the forming. It is thus possible to avoid occurrence of wrinkles on the continuous sheet 27.

As is not shown, distal ends of the liquid passageway 64 are connected to respective pipes having flexibility and resistance to heat. Distal ends of the pipes opposite to the liquid passageway 64 are connected to a liquid pump which is disposed in the stand 34 for the hot liquid medium. The inside of the stand 34 contains a liquid tank and a heater for heating the liquid medium, as well as the liquid pump.

Figure 8:
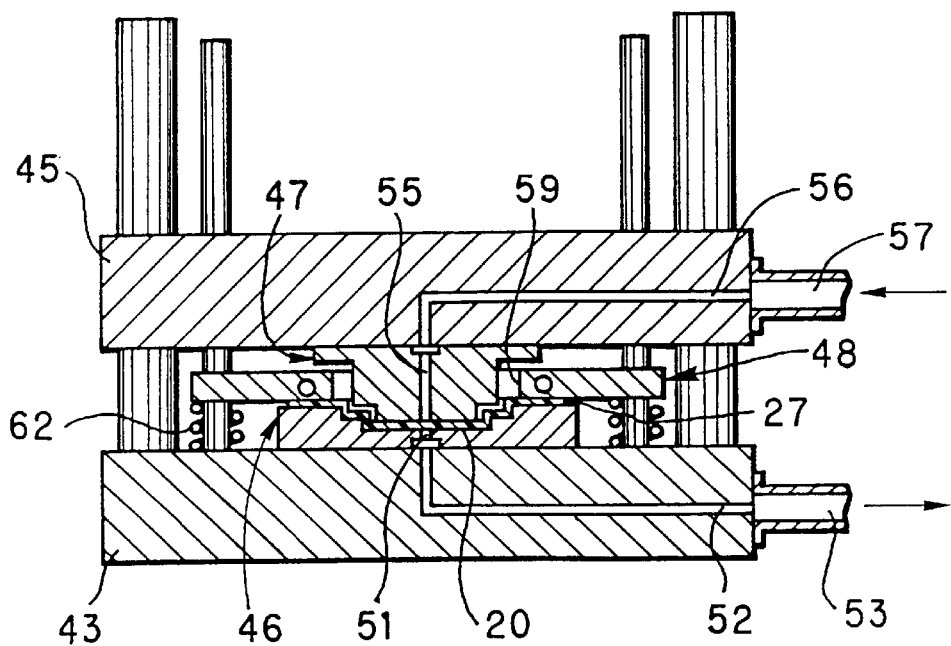
FIG. 8 is a section illustrating the forming unit during suction and pressurization.

At the end of heating the continuous sheet 27, the sheet heater 49 is moved out of the space between the movable support 45 and the mask plate 48. The movable support 45 is lowered further by hydraulic cylinders, cams, and the like. With the movable support 45 lowered, the male molds 47a are inserted into the openings 59 formed in the mask plate 48 as illustrated in FIG. 8, and then into the female molds 46a.

In lowering the movable support 45, the air pressurization is effected through the air mouthpiece 55 in the male molds 47a, to press the continuous sheet 27 against the female molds 46a. The air suction is effected through the air mouthpiece 51 in the female molds 46a, to keep the continuous sheet 27 in tight contact with the female molds 46a, to form five (5) disk-like portions 20 in the continuous sheet 27. Thus the vacuum/air-pressure forming in combination of the air pressurization and the air suction makes it possible to form the disk-like portions 20 with high precision, as the continuous sheet 27 is contacted on the mold set in tighter fashion than the uncombined use of either of the air pressurization and the air suction. The number of the five disk-like portions 20 is appropriate, because it is possible to have only small unevenness in heating and forming of the disk-like portions 20.

The first punching unit 30 is described in detail next. As illustrated in FIG. 3, the first punching unit 30 includes a stationary support 30a and a movable support 30b. The stationary support 30a has a die secured thereto for forming the bearing hole 17a and the slots 23 in the disk-like portions 20. The movable support 30b has a punch secured thereto and movable vertically up and down along guide shafts 30c. The movable support 30b is driven by the hydraulic cylinders, cams, and the like. Scraps created by forming the bearing hole 17a and the slots 23 in the first punching unit 30 are dropped through the die, passed through a path 66 under the stationary support 30a, and exited through an exit 67 formed in a side of the stand 34.

The second punching unit 31 is constructed substantially the same as the first punching unit 30, and includes a stationary support 31a and a movable support 31b. The stationary support 31a has a die secured thereto for forming the contour of the disk-like portions 20. The movable support 31b has a punch secured thereto and movable vertically up and down along guide shafts 31c. The second punching unit 31 is also provided with a push back device known in the art, so that the disks 17 after being punched away can be returned into punch holes in the continuous sheet 27 after the punching. The disks 17 as punched are returned to the continuous sheet 27, of which conveyance causes the disks 17 to move to the disk withdrawing unit 32.

The disk withdrawing unit 32 includes a support plate 69, a disk lift 70 and an arm 72. On the support plate 69 is placed the continuous sheet 27 in which the disks 17 is still kept together. The disk lift 70 removes the disks 17 from the continuous sheet 27 while lifting it. The arm 72 swings the disk lift 70 and moves it to a disk container 71. For the keeping of the disks 17 in the disk lift 70, air suction, electrostatic suction, or a mechanical grasping structure may be utilized. It is necessary that the disk lift 70 is released from the disk keeping upon movement to the disk container 71. It is also possible to eliminate the disk with-drawing unit 32, and to exit the disks 17 through an exit formed in the stand 34 in a similar form to the exit 67 at the first punching unit 30.

Operation of the above construction is described. As illustrated in FIG. 3, a starting command is entered into the disk producing apparatus 26, in which the continuous sheet 27 wound on the drum 36 in the sheet supply unit 28 is drawn by rotation of the sheet winding unit 33, and guided by the guide rollers 40. As illustrated in FIG. 4, the continuous sheet 27 is conveyed between the female mold plate 46 and the mask plate 48 in the forming unit 29. At the same time, the cartridge heater 49b in the sheet heater 49 is energized. The liquid medium, such as water or specialty oil for applying heat, starts being heated and flowing into the mask plate 48. The predetermined temperature is obtained by prestarting heating the sheet heater 49 and the mask plate 48, so that the time for heating the continuous sheet 27 can be short to raise efficiency in producing the disks 17.

Once the continuous sheet 27 is stopped, the movable support 45, as illustrated in FIG. 6, is lowered at a smaller amount by the hydraulic cylinders, cams, and the like. Then the spring 61 biases the mask plate 48, which compresses the spring 62 to squeeze the continuous sheet 27 between it and the female mold plate 46.

While the continuous sheet 27 is entirely squeezed on the mask plate 48, the sheet heater 49 is inserted between the movable support 45 and the mask plate 48 by the air cylinder or solenoid, as illustrated in FIG. 7. The block 49a of the sheet heater 49 has been heated to the temperature of 400±5° C. At the same time as the insertion into the forming unit 29, the sheet heater 49 starts heating the continuous sheet 27. The sheet heater 49 heats only the portions of the continuous sheet 27 emerging through the openings 59 in the mask plate 48, to render the portions as hot as 150° C.

Only the portions of the continuous sheet 27 required in the vacuum/air-pressure forming are heated, so that the continuous sheet 27 is not melted or stuck on the mold set in irrecoverable fashion. The hot liquid medium such as water or specialty oil is circulated through the liquid passageway 64. The portion of the continuous sheet 27 masked in contact with the mask plate 48 is heated to the temperature lower than its softening point by 10–50° C.

When the continuous sheet 27 is at the predetermined temperature, the sheet heater 49 is moved away from between the movable support 45 and the mask plate 48 by the air cylinder or solenoid. As illustrated in FIG. 8, the movable support 45 is further lowered by the hydraulic cylinders, cams, and the like. The male molds 47a are respectively inserted through the openings 59 of the mask plate 48, and into the female molds 46a.

At the same time as the descent of the movable support 45, a vacuum pump connected to the air passageway 52 of the stationary support 43 starts the air suction. A compressor connected to the air passageway 56 of the movable support 45 starts the air pressurization. Then the male molds 47a press the continuous sheet 27 against the female molds 46a, through which the continuous sheet 27 is sucked. The disk-like portions 20 are formed in the continuous sheet 27 with high precision. The continuous sheet 27 is not deformed in un-wanted fashion, as retained between the mask plate 4B and the female mold plate 46. The portion other than the portions with the disk-like portions 20 is also heated by the mask plate 48 and swellable sufficiently, so that no wrinkles or breakage occurs.

The movable support 45, while lowered, is left to stand for a predetermined duration to cool the continuous sheet 27, and then raised again by the hydraulic cylinders, cams, and the like. The mask plate 48 is released from the bias of the spring 61, and has a position between the supports 43 and 45 with the springs 61 and 62 balanced as illustrated in FIG. 4. The continuous sheet 27 restarts being conveyed. A section of the continuous sheet 27 having been provided with the disk-like portions 20 is conveyed to the first punching unit 30.

In the first punching unit 30, the movable support 30b is lowered by the hydraulic cylinders, cams, and the like, to cause a set of a punch and a die to cut the bearing hole 17a and four of the slots 23 in the disk-like portions 20. The scraps created by the cutting are passed through the die and the path 66, and exited from the exit 67 in the stand 34. At the time of the cutting, five other disk-like portions 20 are formed by the forming unit 29 on the continuous sheet 27.

In the second punching unit 31, the movable support 31b is lowered to cut the contour of the disk-like portions 20 from the continuous sheet 27 by means of the punch and the die. The disks 17 cut from the continuous sheet 27 are turned to the continuous sheet 27 by the push back device. After the punching in the second punching unit 31, the movable support 31b is raised. The continuous sheet 27 is conveyed again. In the conveyance, the disks 17 are conveyed with the continuous sheet 27 and transferred to the disk withdrawing unit 32.

In the disk withdrawing unit 32, the disk lift 70 removes the disks 17 from the continuous sheet 27 by sucking or grasping the disks 17. While the disk lift 70 retains the disks 17, the arm 72 rotates to move the disk lift 70 to a position above the disk container 71. Then the disk lift 70 is released from the suction or grasping, to let the disks 17 drop into the disk container 71 which receives the disks 17. The disk container 71, when filled with a great number of the disks 17, is conveyed to a line of assembling the spool 5. In place of the disk container 71 as filled, a new container is positioned in the disk withdrawing unit 32. In repetition of those steps, the disks 17 are produced in successive fashion.

In the above embodiment, the hot liquid medium such as water or specialty oil is used to heat the mask plate 48. It is possible to use electrically heated wires or a feeder slip ring. It is possible that the sheet heater 49 is additionally operated to preheat the mask plate 48. Note that, if there is an undercut on a product to be formed by the vacuum/air-pressure forming, it is preferable to provide the female mold plate 46 with a push-out mechanism for pushing the continuous sheet 27 up.

Figure 9:
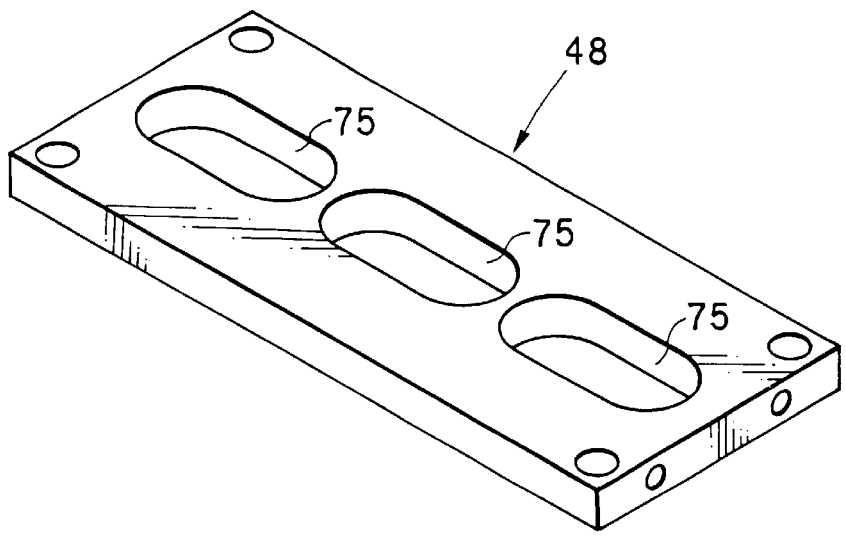
FIG. 9 is a perspective illustrating another preferred mask plate.
Figure 10:
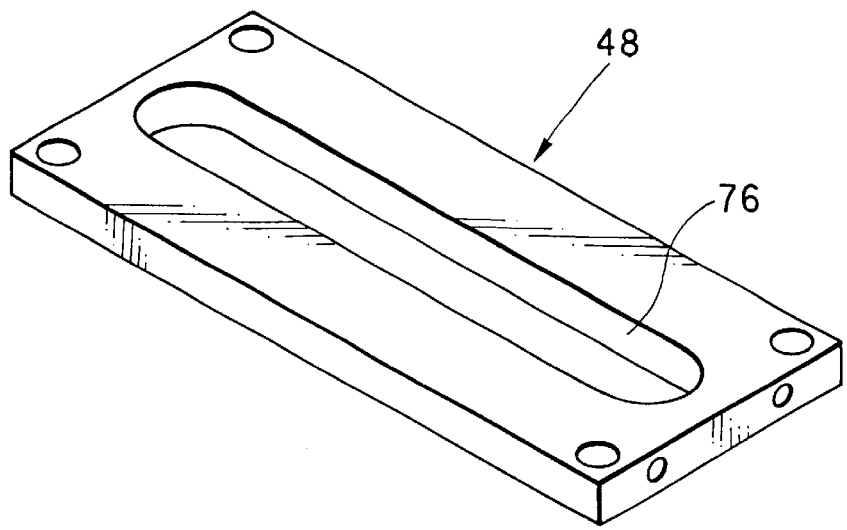
FIG. 10 is a perspective illustrating still another preferred mask plate.

The number of the openings 59 in the mask plate 48 for defining the heated range of the continuous sheet 27 is equal to the number of the disk-like portions 20. However, the number of openings 75 in the mask plate 48 can be half of the number of the disk-like portions 20, as illustrated in FIG. 9. In other words, each of the openings 75 can be twice as large as one of the disk-like portions 20. Further, a single opening 76 can be formed for a train of the plurality of the disk-like portions 20 to be formed at one time, as illustrated in FIG. 10. In the above embodiment, the five of the disk-like portions 20 are formed at one time. It is possible at one time to form four or less, or six or more of the disk-like portions 20.

Figure 11:
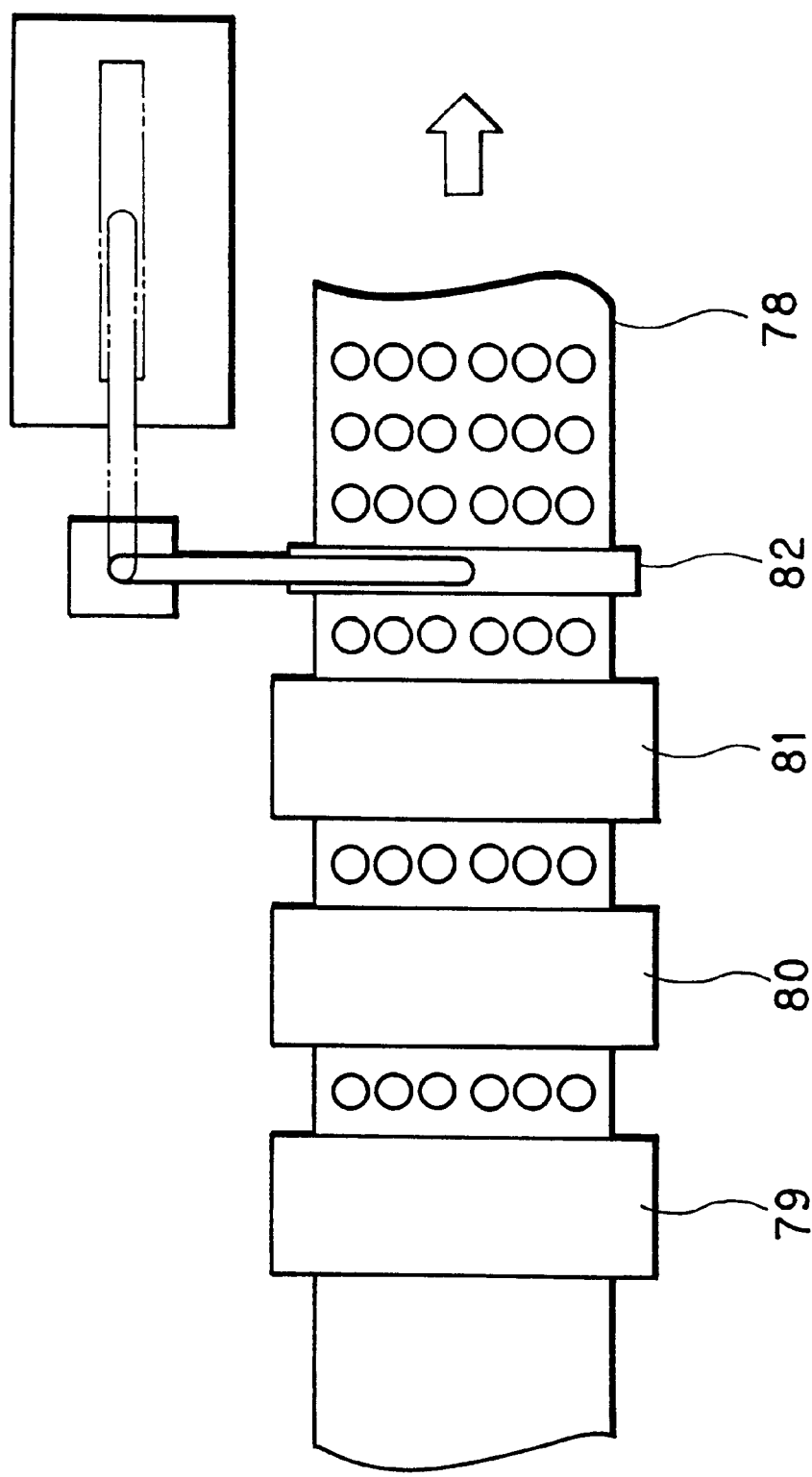
FIG. 11 is an explanatory view illustrating a variant of apparatus in which disks are produced in arrangement of a matrix.

In the above embodiment, the continuous sheet 27 has a width associated with forming of only one of the disk-like portions 20. A plurality of the disk-like portions 20 are either formed and punched at one time in the longitudinal direction of the continuous sheet 27. However a wide continuous sheet 78 can be used as illustrated in FIG. 11. To form and punch a plurality of the disk-like portions 20 in a matrix form at one time, there are arranged a vacuum/air-pressure forming unit 79, a first punching unit 80, a second punching unit 81, and a disk withdrawing unit 82.

Figure 12:
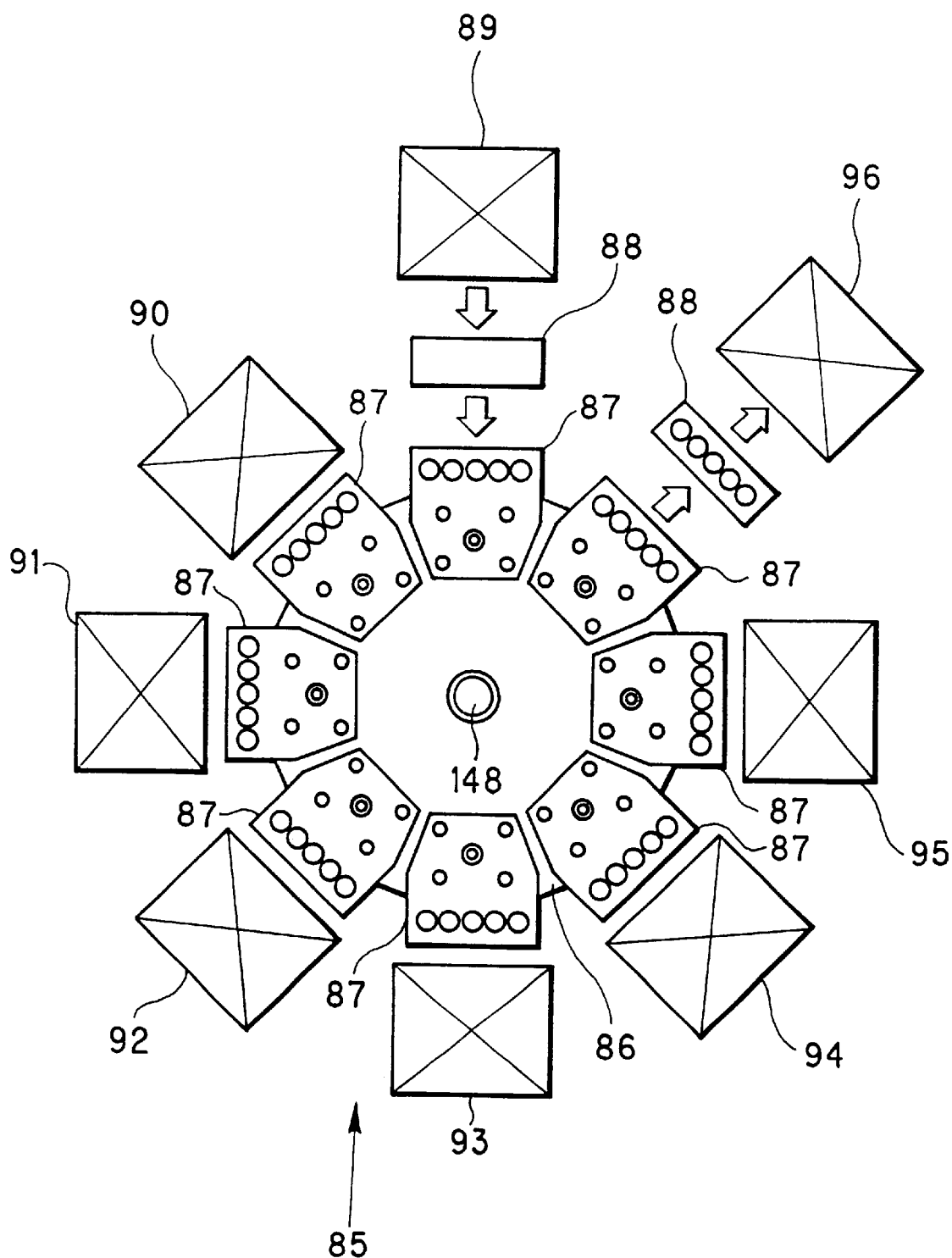
FIG. 12 is an explanatory view illustrating another preferred disk producing apparatus.

Another preferred apparatus 85 for producing a disk is described next. FIG. 12 schematically illustrates the disk producing apparatus 85 inclusive of an index table 86. The index table 86 is rotatable in intermittent fashion in the counterclockwise direction. Eight (8) sheet holders 87 are secured to the index table 86 as a mask device. Around the index table 86 are arranged units of respective steps for producing the disks 17, in stations where each of the sheet holders 87 is stopped in the intermittent rotation of the index table 86.

Those units are a sheet supply unit 89, a sheet heating unit 90, a vacuum/air-pressure forming unit 91, a sheet cooling unit 92, a first punching unit 93, a second punching unit 94, a third punching unit 95, and a sheet exit unit 96, arranged in the order listed. The sheet supply unit 89 cuts a single sheet 88 of a predetermined size from the continuous sheet 27 wound as a roll, and supplies a closely positioned one of the sheet holders 87 with the sheet 88. The sheet heating unit 90 heats the sheet 88 supported in the one sheet holder 87. The forming unit 91 subjects the sheet 88 to the vacuum/air-pressure forming, and forms five of the disk-like portions 20. The sheet cooling unit 92 cools the sheet 88. The first punching unit 93 cuts the bearing hole 17a in the disk-like portions 20. The second punching unit 94 cuts the slots 23 in the disk-like portions 20. The third punching unit 95 cuts the contour of the disk-like portions 20 from the sheet 88 to form the disks 17. The sheet exit unit 96 removes the sheet 88 from the sheet holder 87 after cutting away the disks 17.

Figure 13:
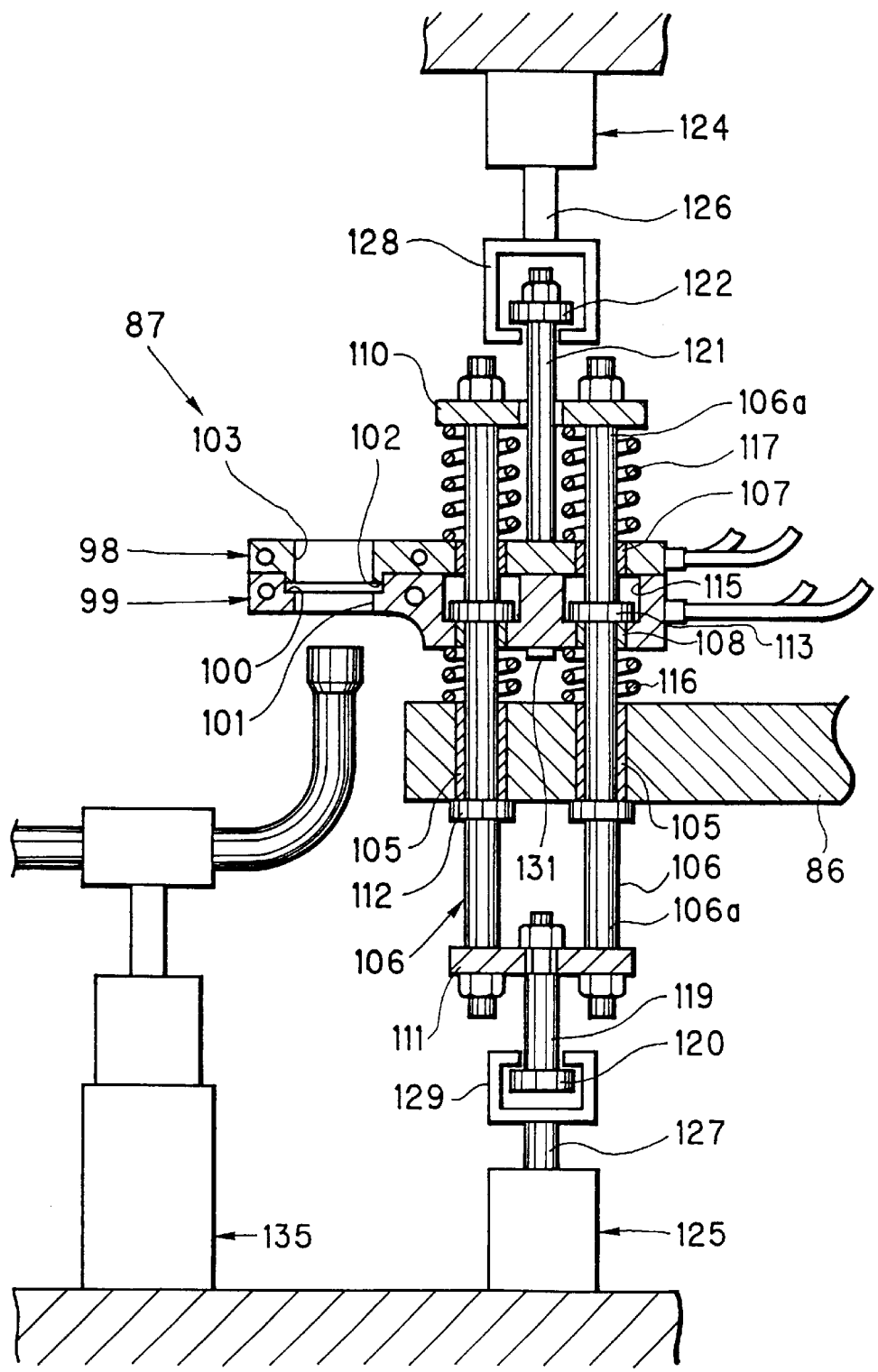
FIG. 13 is a section illustrating one of sheet holders as closed.

The one sheet holder 87, as illustrated in FIG. 13, is constituted by an upper mask plate 98 and a lower mask plate 99. The lower mask plate 99 has a receiving recess 100 and five (5) openings 101. The receiving recess 100 receives the sheet 88. The openings 101 come through the bottom of the receiving recess 100, and respectively have a greater diameter than a diameter of the disks 17. The upper mask plate 98 has a pressing ridge 102 and five (5) openings 103. The pressing ridge 102 is fitted in the receiving recess 100 to squeeze the sheet 88. The openings 103 come through the pressing ridge 102, and respectively have a greater diameter than a diameter of the disks 17.

There are four guide shafts 106 mounted through the index table 86 and slidable vertically via slide bearings 105. The mask plates 98 and 99 receives insertion of the guide shafts 106 and slidable vertically via slide bearings 107 and 108.

Upper and lower ends 106a and 106b of the guide shafts 106 are respectively fixed on retaining plates 110 and 111, to keep adjacent ones of the guide shafts 106 positioned at a regular interval. Two rings or flanges 112 and 113 are disposed on each of the guide shafts 106, and respectively below and above the index table 86. The flange 112 defines an upper limit of sliding the guide shafts 106. The flange 113 defines a lower limit of sliding the guide shafts 106.

The lower mask plate 99 is disposed between the flange 113 and the index table 86. The upper mask plate 98 is disposed between the flange 113 and the retaining plate 110. There are recesses 115 formed in the lower mask plate 99 and located over the slide bearings 108, for receiving the flange 113. A sufficient space can be made between the mask plates 98 and 99 for insertion of the sheet 88, by the virtue of the recesses 115.

There is a spring 116 having greater biasing force, arranged between the lower mask plate 99 and the index table 86 and around each of the guide shafts 106. There is a spring 117 having smaller biasing force than the spring 116, arranged between the retaining plate 110 and the upper mask plate 98 and around each of the guide shafts 106. When not in use, the spring 116 raises the lower mask plate 99 so as to contact the flange 113 on the lower mask plate 99 and contact the flange 112 on the index table 86. At the same time, the spring 117 causes the upper mask plate 98 to contact on the lower mask plate 99.

There is a shaft 119 which is disposed to extend from the retaining plate 111, and comes downwards therefrom. A connector plate 120 is secured to a bottom end of the shaft 119. When the shaft 119 is pulled downwards via the connector plate 120, the guide shafts 106 are also pulled down. The flange 113 of the guide shafts 106 lower the lower mask plate 99 against the bias of the spring 116.

There is a shaft 121 which is disposed to extend from the upper mask plate 98, and comes upwards and through the retaining plate 110. A connector plate 122 is secured to a top end of the shaft 121. When the shaft 121 is pulled upwards via the connector plate 122, the upper mask plate 98 is raised against the bias of the spring 117. With the connector plates 120 and 122 pulled away from one another, there takes place a space between the mask plates 98 and 99 to smooth the supply and exit of the sheet 88.

The sheet supply unit 89 has a pair of solenoids 124 and 125 respectively arranged on the top and the bottom in stationary fashion. The solenoids 124 and 125 have plungers 126 and 127, which are protruded when not energized, and retracted therein when energized. Tips of the plungers 126 and 127 have respective two-bracketed connectors 128 and 129 for engagement. When the one sheet holder 87 is rotated to the sheet supply unit 89, the two-bracketed connectors 128 and 129 receive insertion of the connector plate 120 of the retaining plate 111 and the connector plate 122 of the upper mask plate 98.

When the solenoid 125 is energized, the plunger 127 is pulled to the inside of the solenoid 125. The two-bracketed connector 129 is engaged with the connector plate 120 to pull the guide shafts 106 downwards. The flange 113 pulls the lower mask plate 99 down against the bias of the spring 116. A downstroke of the lower mask plate 99 is adjustable according to an extent of a projecting amount of an adjusting screw 131 on a bottom of the lower mask plate 99. In a similar manner, when the solenoid 124 is energized, the upper mask plate 98 is pulled up by the plunger 126 against the bias of the spring 117. Then the space between the mask plates 98 and 99 is widely formed as illustrated in FIG. 14.

A retaining arm 133 retains the sheet 88 in the air suction. When the one sheet holder 87 is open, the retaining arm 133 with the sheet 88 is driven by an air cylinder or solenoid, and inserted between the mask plates 98 and 99 of the sheet supply unit 89. Then the air suction of the retaining arm 133 is stopped. The sheet 88 is dropped into the receiving recess 100 of the lower mask plate 99.

A suction device 135, for example a vacuum pump device, is disposed under the lower mask plate 99, for sucking the sheet 88 through the openings 101. The suction device 135 has a nozzle 136, which is inserted in the openings 101 when the lower mask plate 99 is pulled down. Even if the sheet 88 has a considerable curl, the sheet 88 can be reliably positioned in the receiving recess 100. While the suction device 135 is effecting the air suction, the solenoids 124 and 125 stop being energized. Then the mask plates 98 and 99 are pressed by the spring 117 and the spring 116. The sheet 88 is squeezed between the mask plates 98 and 99.

With the one sheet holder 87 closed, there takes place a space between the one sheet holder 87 and the suction device 135 as illustrated in FIG. 13. The index table 86 becomes rotatable again without a problem.

Figure 15:
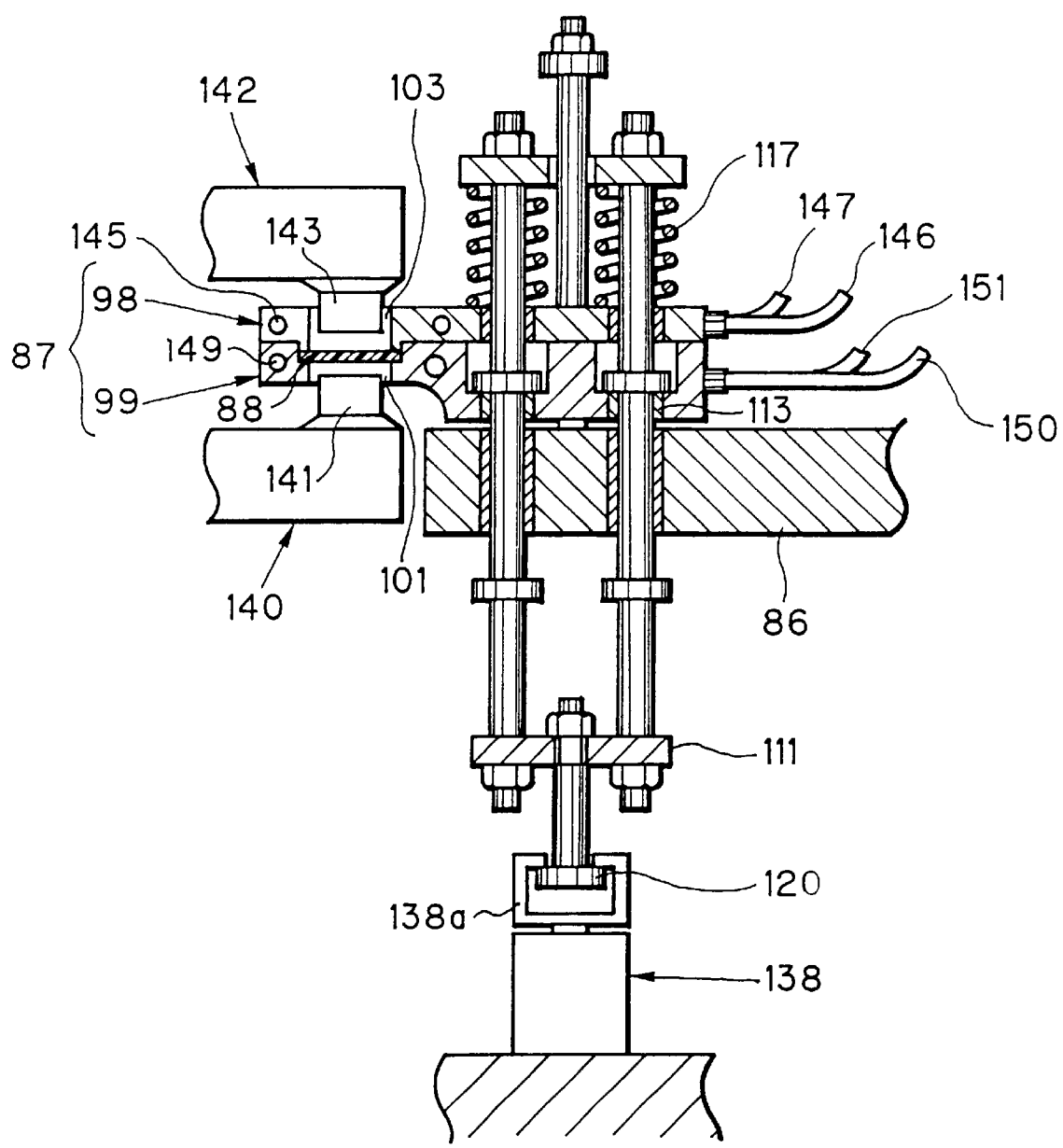
FIG. 15 is a section illustrating the one sheet holder while a sheet is heated.

As illustrated in FIG. 15, the sheet heating unit 90 has a solenoid 138 only on the bottom. The solenoid 138 operates to lower the one sheet holder 87, not to open the one sheet holder 87. When the solenoid 138 is energized and the connector plate 120 is pulled, the lower mask plate 99 is lowered against the spring 116. The one sheet holder 87 is lowered while the sheet 88 is kept retained in the one sheet holder 87, as the upper mask plate 98 is biased downwards by the spring 117.

In the sheet heating unit 90, a lower sheet heater 140 is disposed under the lower mask plate 99. The lower sheet heater 140 includes a heater head 141 and a cartridge heater. The heater head 141 is formed of material with high heat conductivity, such as iron or aluminum. The cartridge heater is incorporated in the heater head 141. When the one sheet holder 87 is pulled down, the heater head 141 of the lower sheet heater 140 is inserted into the openings 101. There is an upper sheet heater 142 disposed above the upper mask plate 98. The upper sheet heater 142 is moved down by an air cylinder, a solenoid and the like not shown, to insert a heater head 143 into the openings 103. In the sheet heating unit 90, portions of the sheet 88 externally emerging through the openings 101 and 103 are heated as hot as 150° C. Only the portions of the sheet 88 to be formed in the vacuum/air-pressure forming are heated, so that the sheet 88 is not melted or stuck on the one sheet holder 87 in irrecoverable fashion.

The temperature is measured near to the sheet 88. When the heating of the sheet 88 is finished, the upper sheet heater 142 is raised. The solenoid 138 finishes being energized. The one sheet holder 87 is moved upwards by the spring 116.

An inside of the upper mask plate 98 has a liquid passageway 145, through which hot liquid medium, such as water or specialty oil for applying heat, is circulated inside the upper mask plate 98. The liquid passageway 145 is disposed around the openings 103. The hot liquid medium is entered into an entrance pipe 146 of the liquid passageway 145, flows through the liquid passageway 145 to heat the one sheet holder 87 to the temperature 10–50° C. lower than a softening point of the sheet 88, and exited from an exit pipe 147 of the liquid passageway 145 to the outside.

The pipes 146 and 147 are passed through a rotary joint 148 (See FIG. 12) disposed at the center of the index table 86, and connected to a liquid pump which is disposed under the index table 86 for the hot liquid medium. Under the index table 86 are arranged a liquid tank and a heater for heating the liquid medium, as well as the liquid pump. Note that a passageway 149, and pipes 150 and 151 associated with the lower mask plate 99 are similar to those elements, and are not described further.

Figure 16:
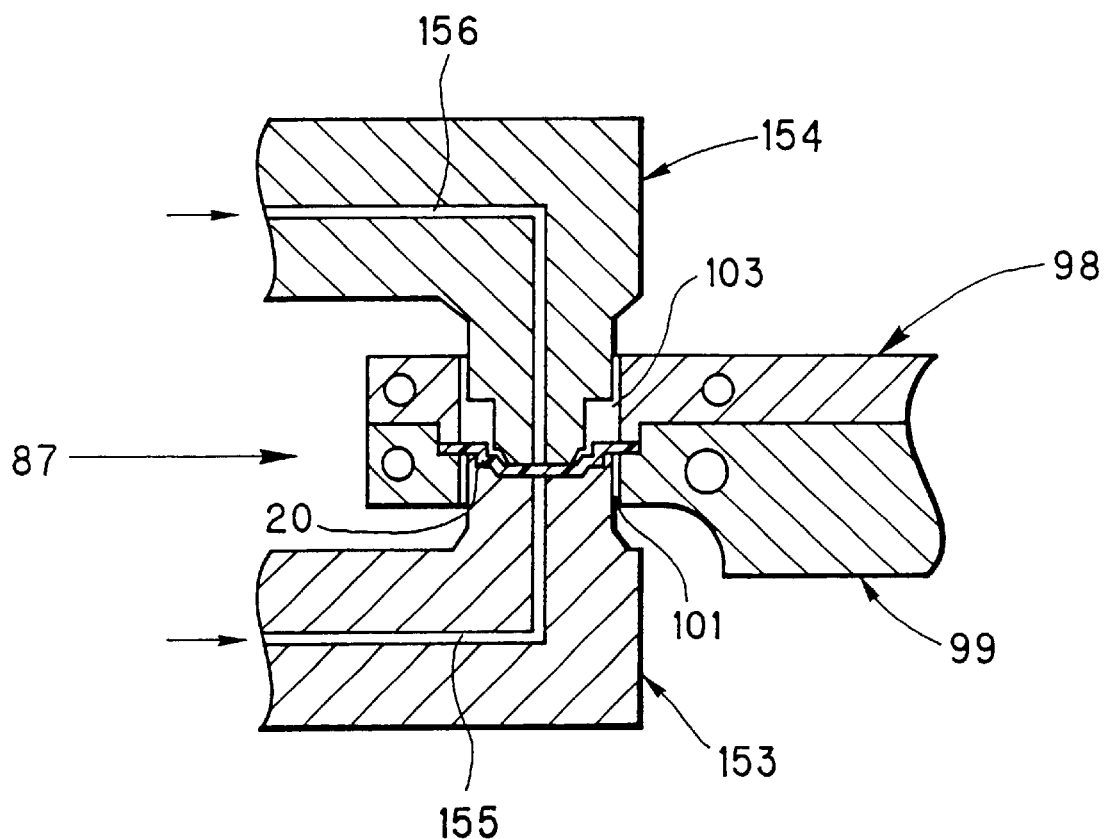
FIG. 16 is a section illustrating the one sheet holder during suction and pressurization.

In the forming unit 91, the one sheet holder 87 is pulled down in a manner similar to the sheet heating unit 90. As illustrated in FIG. 16, a female mold 153 is disposed under the lower mask plate 99. With the one sheet holder 87 pulled down, the female mold 153 is inserted in the openings 101. There is a male mold 154 disposed above the upper mask plate 98. The male mold 154 is moved down by an air cylinder, a solenoid and the like not shown, and inserted into the openings 103. A sucking passageway 155 is formed to communicate through the female mold 153 for the air suction. A sucking passageway 156 is formed to communicate through the male mold 154 for the air pressurization. At the same time as the descent of the one sheet holder 87 and before the descent of the male mold 154, the air suction starts being effected through the sucking passageway 155. The air pressurization starts being effected through the sucking passageway 156. The sheet 88 is tightly contacted on the female mold 153. The five (5) of the disk-like portions 20 are formed in the sheet 88 with high precision.

Thus the portion of the sheet 88 masked in the one sheet holder 87 is heated to the temperature 10–50° C. lower than its softening point, to avoid occurrence of wrinkles on the sheet 88. The sheet 88 is not deformed in unwanted fashion, as retained in the one sheet holder 87.

After the vacuum/air-pressure forming, the sheet cooling unit 92 is adapted to cooling the sheet 88 and in advance of next unit for the punching. Note that it is possible to cool the sheet 88 in the forming unit 91, and to install a unit for withdrawing disks in place of the sheet cooling unit 92.

The first punching unit 93 is adapted to cutting the bearing hole 17a in the disk-like portions 20 formed on the sheet 88. A punch and a die are operated via the openings 101 and 103 respectively in the mask plates 98 and 99. Scraps created by cutting the bearing hole 17a are dropped through the die to exit to the outside, in a manner similar to the former embodiment of FIGS. 1–11.

The second punching unit 94 is adapted to cutting the slots 23 of an arc shape in the disk-like portions 20 formed on the sheet 88. In fashion similar to the first punching unit 93, a punch and a die are operated via the openings 101 and 103 respectively in the mask plates 98 and 99. Scraps created by cutting the slots 23 are dropped through the die to exit to the outside.

The third punching unit 95 is adapted to cutting the contour of the disk-like portions 20 from the sheet 88. In fashion similar to the punching units 93 and 94, a punch and a die are operated. The disks 17 as cut out are dropped through the die, and contained in a disk container disposed under the die. This being so, the precision of the disks 17 as produced is heightened by precise positioning of the sheet holders 87 in the successive units, so that eccentricity between the forming and the punching is reduced.

It is also possible to provide the third punching unit 95 with a push back device, so that the disks 17 after being punched away can be returned to the sheet 88 after the punching. For this structure, a disk withdrawing unit may be provided for withdrawing the disks 17 from the sheet 88. Also, it is alternatively possible that the bearing hole 17a, the slots 23 and the contour is cut by the first punching unit 93, and the punching units 94 and 95 are eliminated.

The sheet exit unit 96 is structurally similar to the sheet supply unit 89, and has two solenoids respectively arranged on the top and the bottom in stationary fashion, for opening a space between the mask plates 98 and 99. There is a retaining arm similar to the retaining arm 133 of the sheet supply unit 89. When the one sheet holder 87 is open, the retaining arm is driven by an air cylinder or solenoid, and inserted into the one sheet holder 87. The retaining arm takes up the sheet 88 from the receiving recess 100, retains it by the air suction, is moved out of the one sheet holder 87, and exit the sheet 88 from the one sheet holder 87 after punching of the disks 17. Note that the sheet exit unit 96 can have an air cylinder or hydraulic cylinder instead of the solenoid, for driving the one sheet holder 87.

Operation of the above embodiment is described now. In FIG. 12, a starting command is entered into the disk producing apparatus 85, which starts intermittent rotation of the index table 86. At the same time as this, the upper sheet heater 142 and the lower sheet heater 140 of the sheet heating unit 90 are energized. The hot liquid medium, such as water or specialty oil for applying heat, starts flowing through the liquid passageways 145 and 149 in the mask plates 98 and 99. The one sheet holder 87 is heated to the temperature 10–50° C. lower than the softening point of the sheet 88.

The index table 86 is stopped, to locate the one of the one sheet holder 87 in the sheet supply unit 89 as illustrated in FIG. 13. The connector plate 122 of the upper mask plate 98 and the connector plate 120 of the retaining plate 111 are inserted respectively in the two-bracketed connectors 128 and 129 of the solenoids 124 and 125. After insertion of the connector plate 122 and the connector plate 120 into the two-bracketed connectors 128 and 129, the solenoids 124 and 125 are energized.

With the solenoids 124 and 125 energized, the plungers 126 and 127 are withdrawn into the solenoids 124 and 125. The two-bracketed connectors 128 and 129 pull the connector plate 122 and the connector plate 120 vertically. The guide shafts 106 are pulled down by the retaining plate 111. The lower mask plate 99 is lowered by the flange 113 against the spring 116. The upper mask plate 98 is pulled up against the spring 117, to widen the space between the mask plates 98 and 99 as illustrated in FIG. 14.

The retaining arm 133 is driven by the air cylinder or solenoid and inserted between the mask plates 98 and 99, while retaining the sheet 88 in the air suction after the cutting from the continuous sheet 27. Then the retaining arm 133 is released from the air suction, to drop the sheet 88 to the receiving recess 100 in the lower mask plate 99. The air suction is being effected through the nozzle 136, which is lowered into the openings 101 in lowering of the lower mask plate 99. Even with the curl, the sheet 88 is reliably contained in the receiving recess 100.

When the sheet 88 finishes being supplied, the retaining arm 133 is retracted from the mask plates 98 and 99. The solenoids 124 and 125 stop being energized. The mask plates 98 and 99 are pressed by the spring 117 and the spring 116, to come to each other. The pressing ridge 102 of the upper mask plate 98 is received in the receiving recess 100 of the lower mask plate 99. The sheet 88 is squeezed between the mask plates 98 and 99. The suction device 135 still effects air suction until the one sheet holder 87 is closed.

When the one sheet holder 87 is supplied with the sheet 88, the index table 86 is rotated again intermittently, to convey the one sheet holder 87 to the sheet heating unit 90. As illustrated in FIG. 15, the sheet heating unit 90 has the solenoid 138 under the sheet holders 87. A two-bracketed connector 138a pulls the connector plate 120 of the retaining plate 111, to slide down the guide shafts 106. The lower mask plate 99 is pulled by the flange 113 of the guide shafts 106, and lowered against the spring 116. The upper mask plate 98 follows the descent of the lower mask plate 99 under the bias of the spring 117. The sheet 88 still remains retained.

The one sheet holder 87 is pulled down. The heater head 141 of the lower sheet heater 140 is inserted into the openings 101, to heat the bottom of the sheet 88. After the descent of the one sheet holder 87, the upper sheet heater 142 is lowered from the upper mask plate 98 by the air cylinder, the solenoid and the like. The heater head 143 is inserted into the openings 103. The portions of the sheet 88 emerging through the openings 101 and 103 are heated as hot as 150° C. With the hot liquid medium such as water or specialty oil circulated through the liquid passageways 145 and 149 in the mask plates 98 and 99, the portion of the sheet 88 masked in contact with the one sheet holder 87 and excluded from the vacuum/air-pressure forming are heated to the temperature 10–50° C. lower than the softening point of the sheet 88.

Heating of the sheet 88 is finished when the temperature near to the sheet 88 comes up to the predetermined value. The upper sheet heater 142 is raised first. Then the solenoid 138 finishes being energized. The one sheet holder 87 is raised by the bias of the spring 116. It is also possible to measure preheating time experimentally for heating the sheet 88 with the heaters, and to finish preheating the sheet 88 when the measured time lapses.

After heating the sheet 88, the index table 86 is rotated again, to convey the one sheet holder 87 to the forming unit 91. The forming unit 91 has the single solenoid under the sheet holders 87, in a manner similar to the sheet heating unit 90. The one sheet holder 87 is lowered again. As illustrated in FIG. 16, the female mold 153 is under the lower mask plate 99. With the one sheet holder 87 pulled down, the female mold 153 is inserted in the openings 101. After the descent of the one sheet holder 87, the male mold 154 is moved down lower than the upper mask plate 98 by the air cylinder, the solenoid and the like, and inserted into the openings 103.

When the male mold 154 is lowered, the air suction is effected through the sucking passageway 155 in the female mold 153, to keep the sheet 88 in tight contact with the female mold 153 after the heating and softening. The air pressurization is effected through the male mold 154 to press the sheet 88 against the female mold 153. Then the disk-like portions 20 are formed in the sheet 88 with high precision. No wrinkles occur, as the portion of the sheet 88 in the one sheet holder 87 has been heated.

After the forming of the disk-like portions 20, the male mold 154 is raised, before the one sheet holder 87 is raised. The index table 86 is rotted again. As illustrated in FIG. 12, the one sheet holder 87 is conveyed to the lower, where the sheet 88 is cooled in advance of next unit for the punching. For the cooling, the sheet 88 can be left to stand as it is for a predetermined duration. Or air may be caused to blow the sheet 88 to cool the same forcibly.

After cooling of the sheet 88, the index table 86 is rotated again. The one sheet holder 87 is conveyed to the first punching unit 93, where the bearing hole 17a is cut in the disk-like portions 20 on the sheet 88 by the punch and the die. The scraps created by cutting the bearing hole 17a are dropped through the die to exit to the outside.

The sheet 88 in which the bearing hole 17a is formed is conveyed to the second punching unit 94 by rotation of the index table 86. In the second punching unit 94, the slots 23 of the arc shape is cut in the disk-like portions 20 on the sheet 88 by the punch and the die. In the fashion similar to the first punching unit 93, the scraps created by cutting the slots 23 are dropped through the die to exit to the outside.

The sheet 88 worked in the second punching unit 94 is conveyed to the third punching unit 95 by rotation of the index table 86. In the third punching unit 95, the contour of the disk-like portions 20 is cut in the sheet 88. The disks 17 are dropped into the disk container which receives the disks 17. The disk container, when filled with a great number of the disks 17, is conveyed to a line for the spool 5. In place of the disk container as filled, a new container is positioned in the third punching unit 95. In repetition of those steps, the disks 17 are produced in successive fashion.

In the above embodiment, the hot liquid medium such as water or specialty oil applies heat to the sheet holders 87.

Electrically heated wires or a feeder slip ring is also usable. Note that, if a product to be formed by the vacuum/air-pressure forming has an undercut, it is preferable to provide the female mold 153 with a push-out mechanism for pushing the sheet 88 up.

The number of the openings 101 and 103 for defining the heated range of the sheet 88 is set equal to the number of the disk-like portions 20. However it is possible that each of openings is twice as great as one of the disk-like portions 20, similarly to the openings 75 in FIG. 9. Further, a pair of single openings can be formed for a train of the plurality of the disk-like portions 20 to be formed at one time, similarly to the single opening 76 in FIG. 10.

Figure 17:
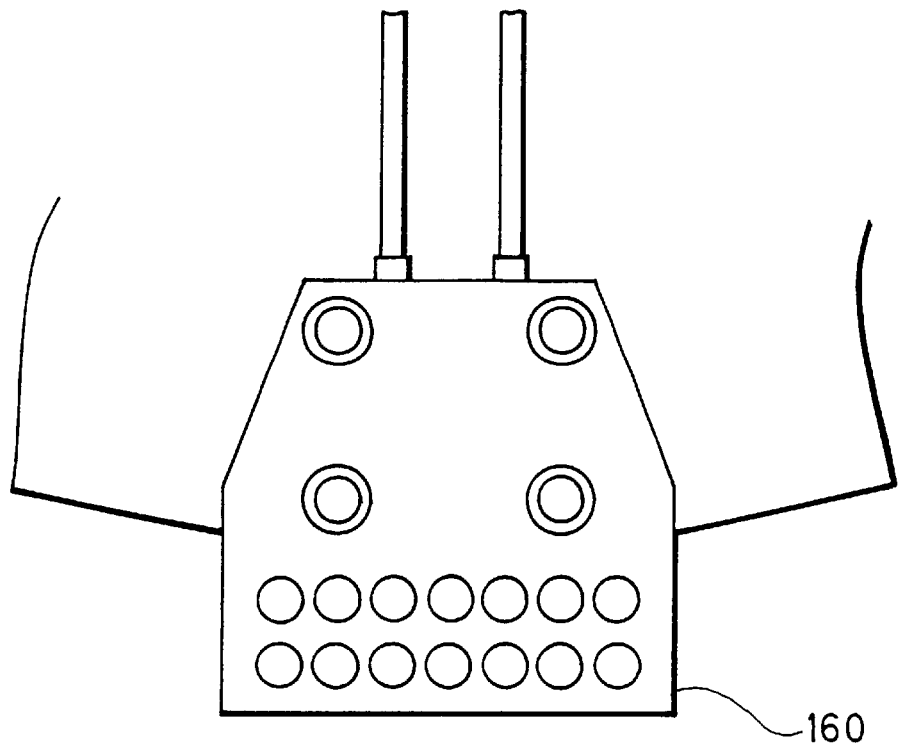
FIG. 17 is a plan illustrating another preferred sheet holder.
Figure 18:
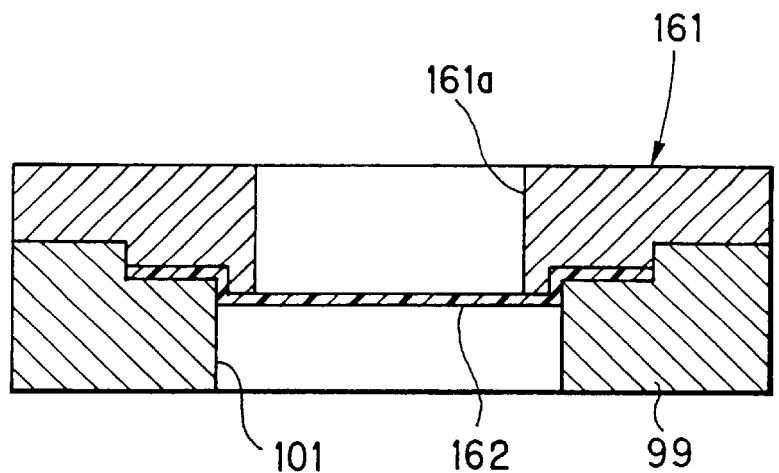
FIG. 18 is a section illustrating still another preferred sheet holder.

In the above embodiment, the five (5) of the disks 17 are formed at one time. Of course the present invention is applicable to forming of a greater number of the disks 17 at one time in two or three lines as a matrix form, as illustrated in FIG. 17 with a sheet holder 160 as mask device. It is also possible in FIG. 18 to dispose a ring-like projection 161b around a bottom of an opening 161a in an upper mask plate 161, for contact with a sheet 162 as squeezed. The size of the opening 161a is set considerably greater than the disks 17 in view of preventing the ring-like projection 161b from influencing the disk-like portions 20.

It is further possible in the forming unit 91 to form a positioning portion at the center of each of the disk-like portions 20 in a size smaller than the bearing hole 17a. In the first punching unit 93, the bearing hole 17a can be cut by utilizing the positioning portion. This raises concentricity between the disk-like portions 20 and the bearing hole 17a. It is also possible to set up a slit punching unit instead of the sheet cooling unit 92. The slit punching unit can be adapted to cutting bend slits in the periphery of the disk-like portions 20. The disk-like portions 20 can be rendered movable from the sheet 88 in minute fashion in any direction, without removal from the sheet 88.

Figure 19:
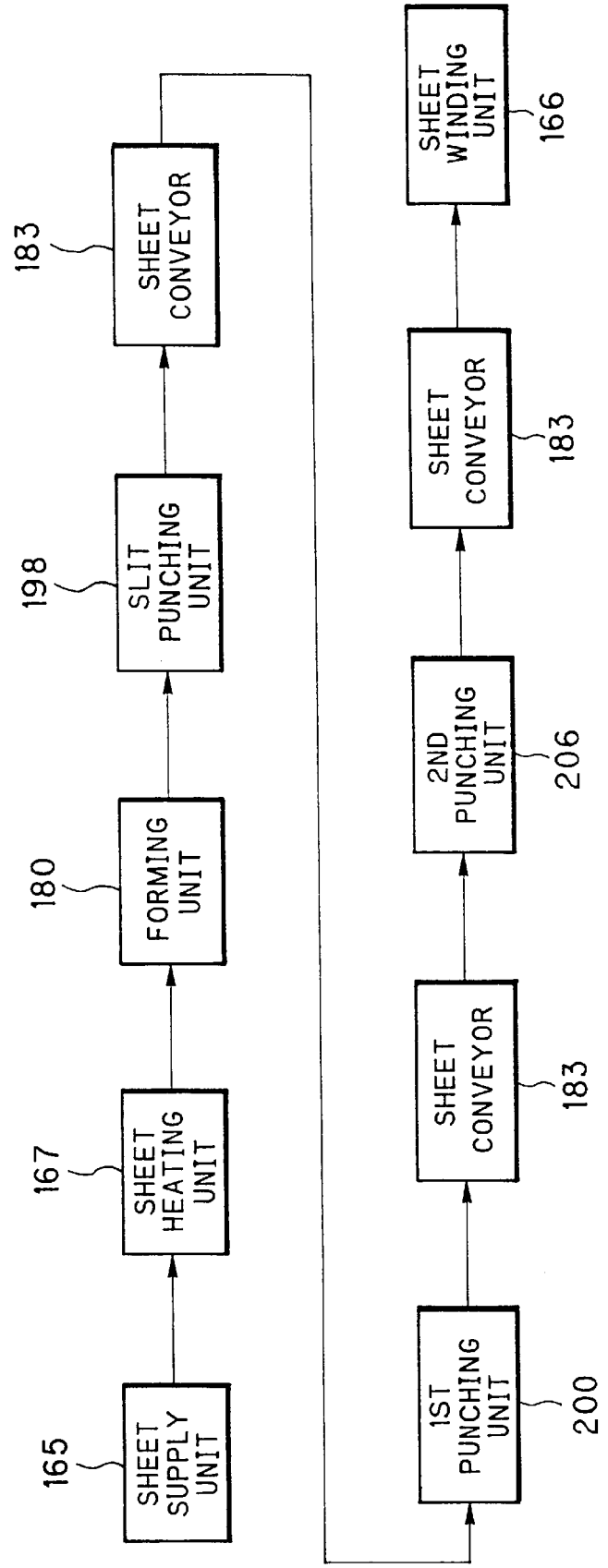
FIG. 19 is a chart illustrating a flow of a further preferred disk producing apparatus.

Still another preferred disk producing apparatus is described now. As illustrated in FIG. 19, units for the disk production are rectilinearly arranged in similar fashion to the first preferred embodiment. A sheet supply unit 165 is substantially the same as the sheet supply unit 28 of FIG. 3. A sheet winding unit 166 is substantially the same as the sheet winding unit 33. Those are not described any further in detail.

Figure 20:
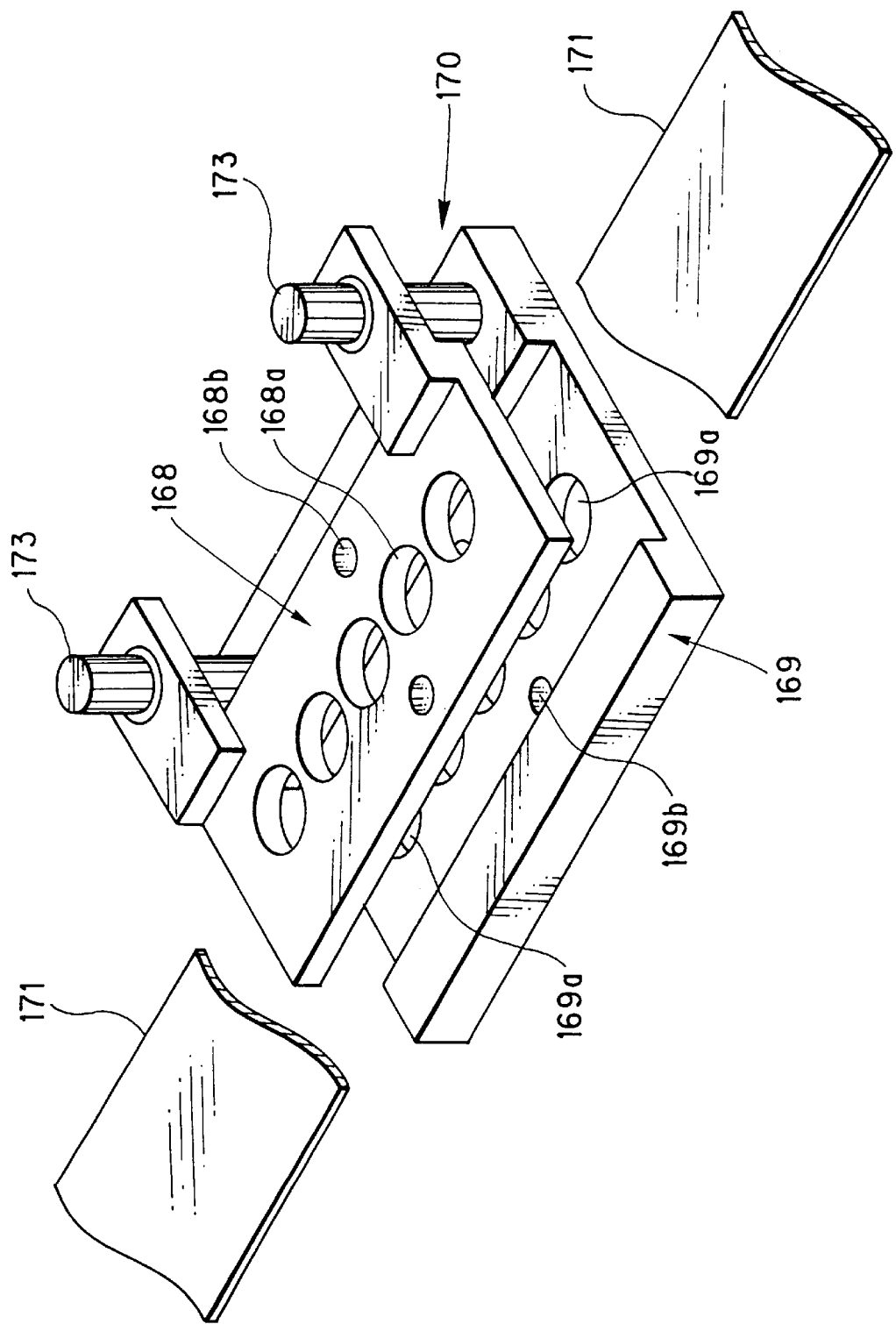
FIG. 20 is a perspective illustrating a mask device.

The sheet supply unit 165 supplies a sheet heating unit 167 with a continuous sheet 171 (See FIG. 20) of thermoplastic resin. The sheet heating unit 167, as illustrated in FIG. 20, has a mask device 170 including an upper mask plate 168 and a lower mask plate 169. The continuous sheet 171 is conveyed between the mask plates 168 and 169. The upper mask plate 168 has five greater openings 168a larger than the disks 17, and two smaller openings 168b smaller than the greater openings 168a. Similarly the lower mask plate 169 has five greater openings 169a and two smaller openings 169b. The smaller openings 168b and 169b are adapted to heating the continuous sheet 171 at portions formed to be retainable portions used in conveyance of the continuous sheet 171.

The upper mask plate 168 is secured to guide shafts 173 erected on the lower mask plate 169, and is vertically movable along the guide shafts 173 by means of hydraulic cylinders, air cylinders, cams, and the like. The upper mask plate 168, when lowered, squeezes the continuous sheet 171 between it and the lower mask plate 169, and prevents the continuous sheet 171 from being deformed. As is not shown, the inside of the mask plates 168 and 169 respectively has a liquid passageway, through which hot liquid medium, such as water or specialty oil for applying heat, is circulated, in the same manner as the former embodiments. The hot liquid medium heats the continuous sheet 171 to the temperature 10–50° C. lower than a softening point of the continuous sheet 171.

Figure 21:
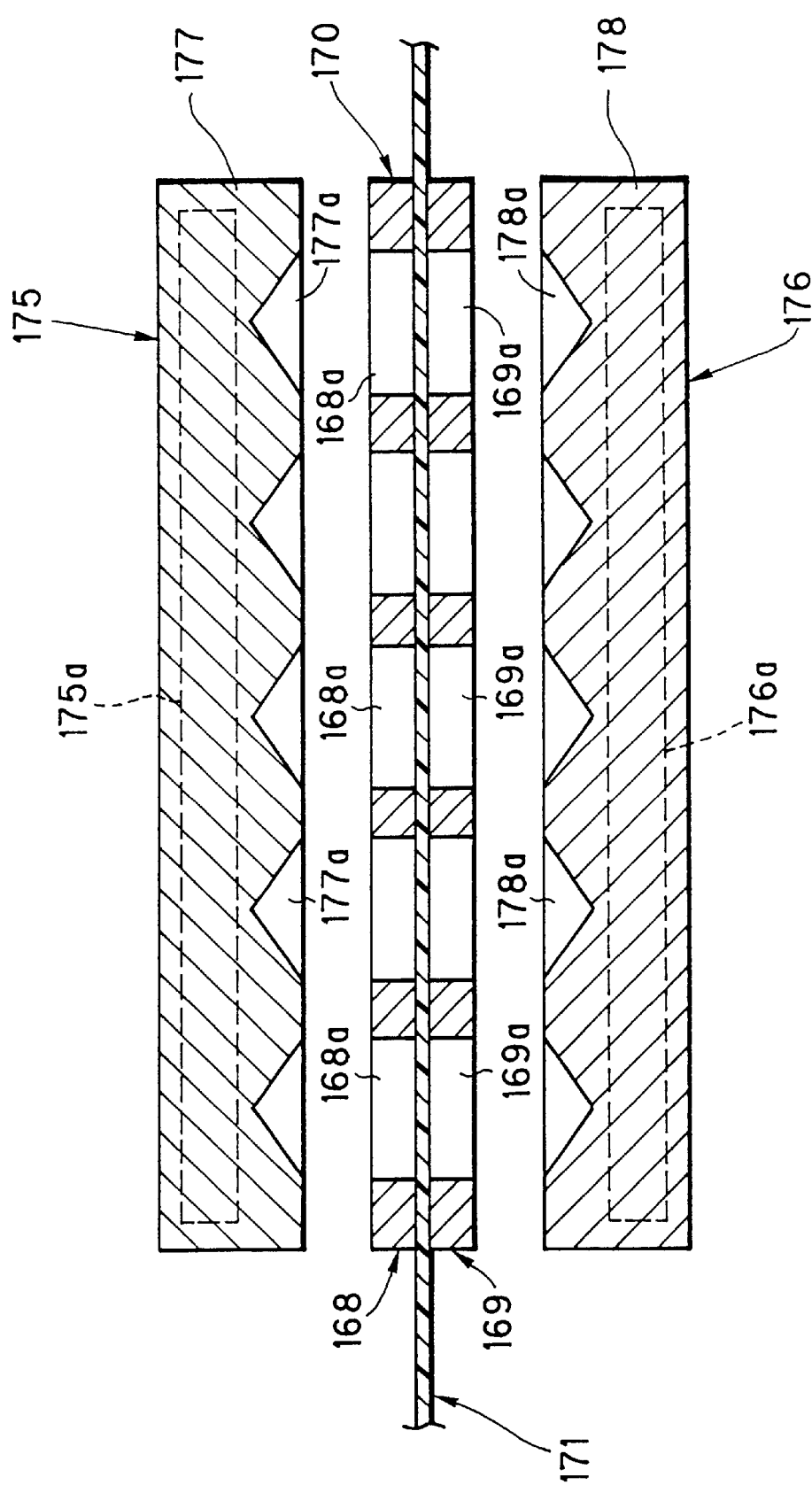
FIG. 21 is a section illustrating a sheet heating unit.

As illustrated in FIG. 21, a upper sheet heater 175 and a lower sheet heater 176 are disposed so that the mask device 170 lies between them. A block 177 incorporates a cartridge heater 175a. A block 178 incorporates a cartridge heater 176a. The block 177 and 178 are respectively formed of material with high heat conductivity, such as iron or aluminum. The cartridge heaters 175a and 176a are controlled so that the blocks 177 and 178 surface temperature of 400±5° C., to heat the portions of the continuous sheet 171 emerging through the greater openings 168a and 169a as hot as 150° C. Heating of the continuous sheet 171 is finished when the temperature near to the continuous sheet 171 as measured comes up to 150° C. as predetermined. It is also possible to measure preheating time experimentally for heating the continuous sheet 171 with the heaters, and to finish preheating the continuous sheet 171 and convey the continuous sheet 171 when the measured time lapses.

There are regulating recesses 177a and 178a in the blocks 177 and 178 in positions confronted respectively with the greater openings 168a and 169a in the mask plates 168 and 169. If it were not for the regulating recesses 177a and 178a, it would be likely that portions of the continuous sheet 171 emerging through the greater openings 168a and 169a would have unevenness in temperature: the center of each portion would be hotter than the periphery. There would occur distortion in disks. However the use of the regulating recesses 177a and 178a is advantageous, as their distance to the continuous sheet 171 is increased from each periphery of the portions to be heated toward each center of the portions.

Figure 22A:
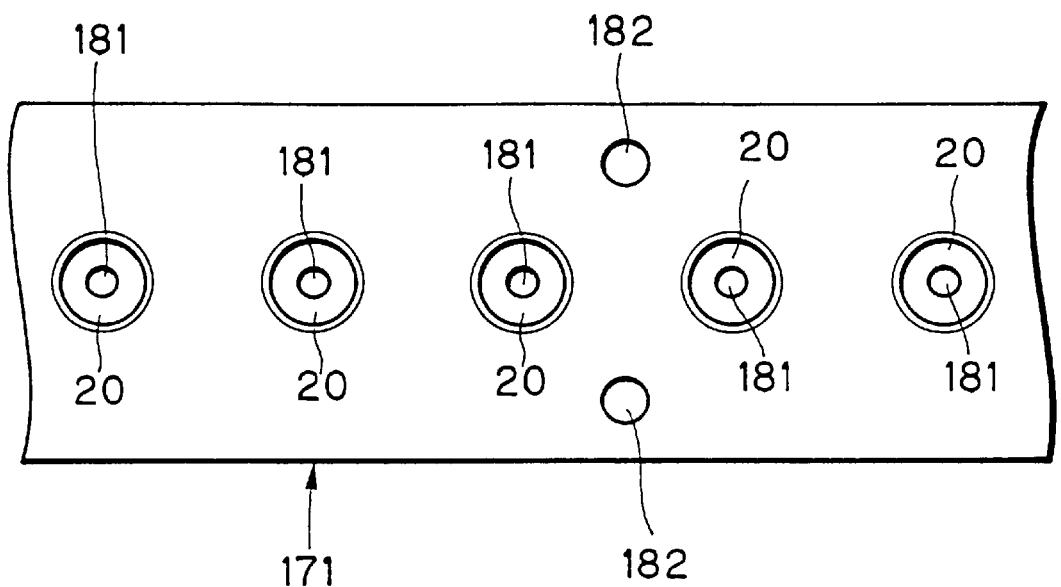
FIGS. 22A and 22B are explanatory views illustrating a sheet after vacuum/air-pressure forming.
Figure 22B:
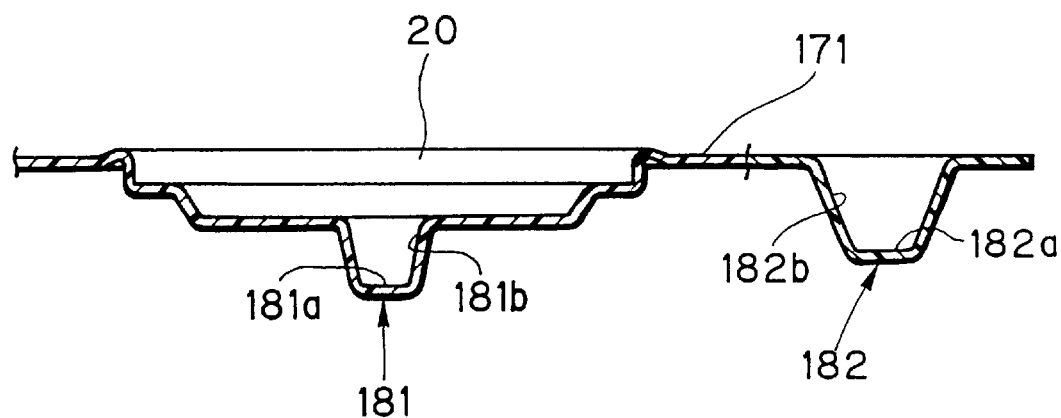

The continuous sheet 171 heated by the sheet heating unit 167 is conveyed to a forming unit 180, where the heated portions of the continuous sheet 171 are tightly contacted on a mold set by the vacuum/air-pressure forming the same as the former embodiments, to form the disk-like portions 20 in FIGS. 22A and 22B with high precision. The continuous sheet 171 is not melted, stuck on the sheet holders 87, or torn in irrecoverable fashion. The portion of the continuous sheet 171 other than the portions for the disk-like portions 20 is also heated by the mask plates 168 and 169 and swellable sufficiently, so that no wrinkles occurs in the continuous sheet 171.

A positioning portion 181 and a retainable portion 182 are formed by the vacuum/air-pressure forming. The positioning portion 181 is located at the center of the disk-like portions 20 at a radius smaller than the bearing hole 17a. The retainable portion 182 is located in each of positions heated through the smaller openings 168b and 169b in the mask plates 168 and 169. The positioning portion 181 and the retainable portion 182 have respective conical shapes inclusive of conical faces 181b and 182b in inclination and bottom faces 181a and 182a. The bottom faces 181a and 182a are substantially flat. The positioning portion 181 and the retainable portion 182 respectively receive insertion of a positioning pin and a conveying pin. In this insertion, the conical faces 181b and 182b operate for guiding the pins into the positioning and retainable portions 181 and 182.

Figure 22C:
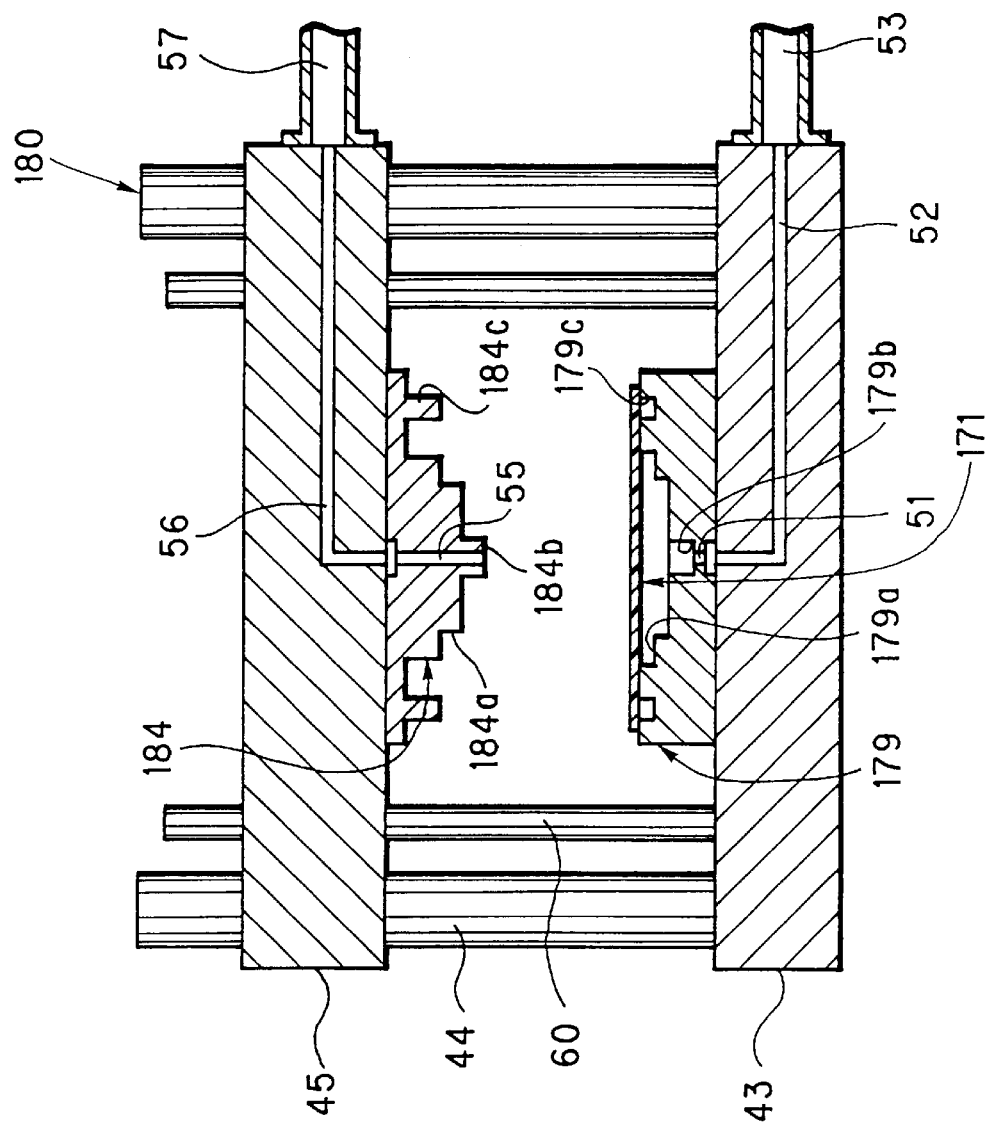
FIG. 22C is a section illustrating a forming unit.

FIG. 22C illustrates construction of the forming unit 180. A female mold plate 179 is mounted on the stationary support 43, and includes five (5) disk-molding female molds 179a aligned in the conveying direction of the continuous sheet 171. Five (5) positioner-molding female molds 179b are also aligned, and respectively located at the centers of the disk-molding female molds 179a. Two (2) retainer-molding female molds 179c are arranged in the width direction of the continuous sheet 171. A male mold plate 184 is mounted on the movable support 45, and includes five (5) disk-molding male molds 184a, five (5) positioner-molding male molds 184b, and two (2) retainer-molding male molds 184c. Each combination of the positioner-molding female molds 179b and the positioner-molding male molds 184b forms the positioning portion 181. Each combination of the retainer-molding female molds 179c and the retainer-molding male molds 184c forms the retainable portion 182.

Figure 23:
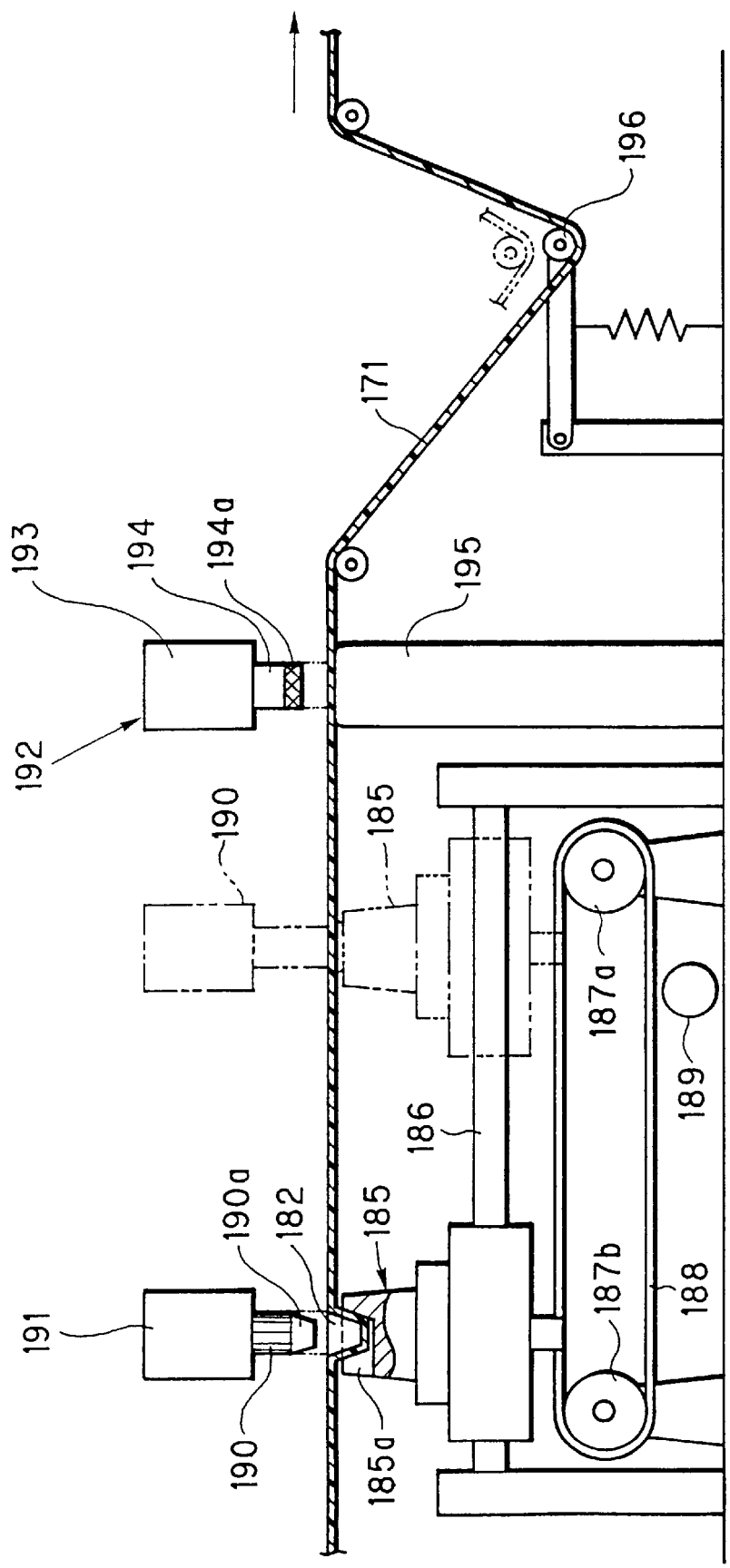
FIG. 23 is an explanatory view illustrating a sheet conveyor.

The continuous sheet 171 is conveyed by a sheet conveyor 183 utilizing the retainable portion 182. In the sheet conveyor 183, a receiving recess 185a is formed in a top of a sheet clamp 185. As illustrated in FIG. 23, the retainable portion 182 is inserted into the receiving recess 185a in the course of conveying the continuous sheet 171. The receiving recess 185a is open in a direction in reverse to conveyance of the continuous sheet 171, of which conveyance inevitably causes the receiving recess 185a to receive the retainable portion 182.

The sheet clamp 185 is mounted on a guide shaft 186 disposed in parallel with a conveying path of the continuous sheet 171. Slide bearings (not shown) render the sheet clamp 185 slidable along the guide shaft 186. The sheet clamp 185 is connected to a belt 188, which is disposed on the periphery of pulleys 187a and 187b under the guide shaft 186. When the pulley 187a is rotated by a motor 189, the sheet clamp 185 is slid by the guide shaft 186.

Above the sheet clamp 185 is located a conveying pin 190, which can be slid by driving a solenoid 191, between an upwards retracted position and a downwards protruded position. When protruded downwards, the conveying pin 190 is inserted in the retainable portion 182 at the receiving recess 185a. An inclined face 190a of the conveying pin 190 is contacted on the conical face 182b of the retainable portion 182, to position the retainable portion 182, which is clamped between the conveying pin 190 and the receiving recess 185a at the same time. The conveying pin 190, while the retainable portion 182 is clamped, is moved to a position indicated by the phantom line, to convey the continuous sheet 171 in intermittent fashion.

In a position downstream from the sheet clamp 185, a sheet retaining mechanism 192 is disposed for pressing the continuous sheet 171. The sheet retaining mechanism 192 includes a pressing pin 194 and a table 195. The pressing pin 194 is movable with a solenoid 193. The table 195 is located under the continuous sheet 171. After conveyance of the continuous sheet 171, the pressing pin 194 is protruded by the solenoid 193, to squeeze the continuous sheet 171 between it and the table 195 to keep the continuous sheet 171 immovable after the stop. A rubber head 194a is fixed on the bottom of the pressing pin 194, to retain the continuous sheet 171 reliably and avoid scratching the continuous sheet 171.

A dancer roller 196 is disposed past the sheet retaining mechanism 192, for absorbing looseness of the continuous sheet 171 while applying sufficient tension thereto. Note that the conveying pin 190 and the pressing pin 194 may be protruded by use of air cylinders, cams or the like, instead of the solenoids 191 and 193.

Figure 24A:
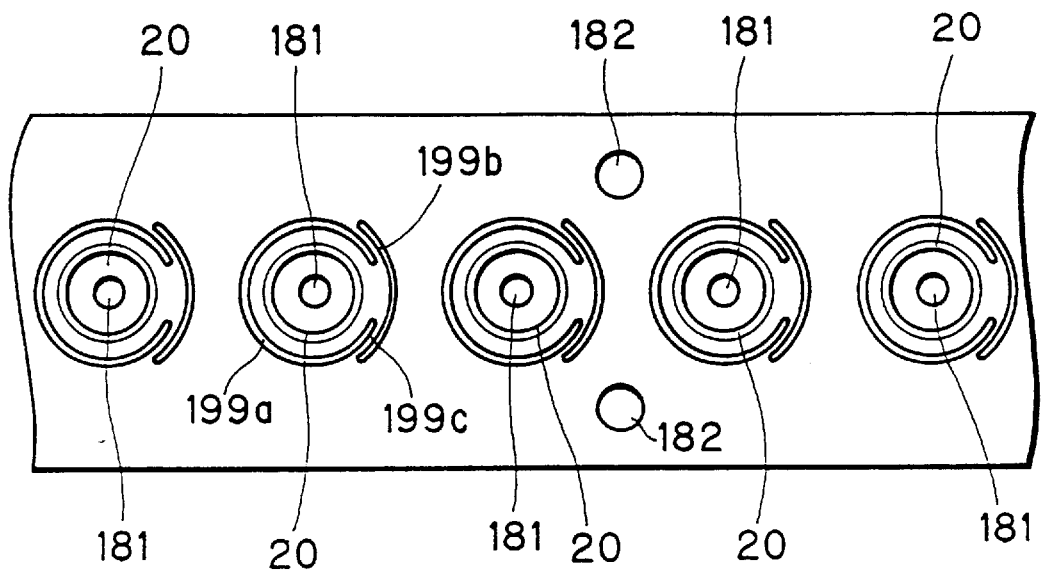
FIGS. 24A and 24B are explanatory views illustrating the sheet after the slit punching.
Figure 24B:
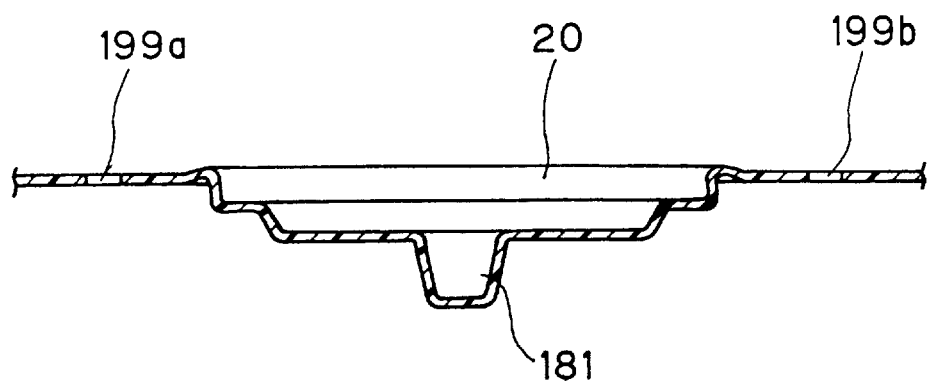

After the forming unit 180 forms the disk-like portions 20, the positioning portion 181 and the retainable portion 182, the continuous sheet 171 is conveyed to a slit punching unit 198. In the slit punching unit 198, a punch and a die, known in the art, form two kinds of bend slits 199a and 199b in arcuate shapes in the periphery of the disk-like portions 20 as illustrated in FIGS. 24A and 24B. The disk-like portions 20 remain connected to the continuous sheet 171 via bridge portions 199c defined by the bend slits 199a and 199b. The disk-like portions 20 are rendered movable from the continuous sheet 171 in minute fashion in any direction, without removal from the continuous sheet 171. Scraps created by cutting the bend slits 199a and 199b are dropped through the die to exit to the outside.

Figure 25A:
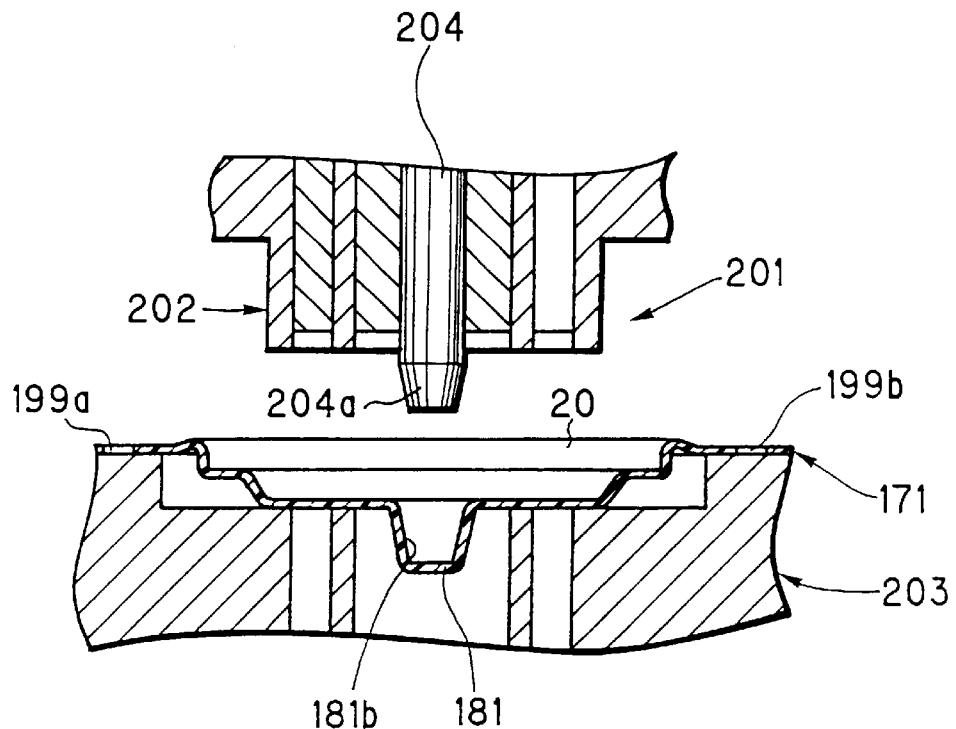
FIGS. 25A and 25B are sections illustrating operation of a first punching unit.

After the slit punching, the continuous sheet 171 is conveyed by the sheet conveyor 183 to a first punching unit 200. As illustrated in FIG. 25A, the first punching unit 200 has a punch/die set 201 for cutting the bearing hole 17a and the slots 23 in the disk-like portions 20 at the same time. The punch/die set 201 includes a punch 202 above the continuous sheet 171 and a die 203 under the continuous sheet 171. The center of the punch 202 has a positioning pin 204, to be inserted in the positioning portion 181 to position the disk-like portions 20.

Figure 25B:
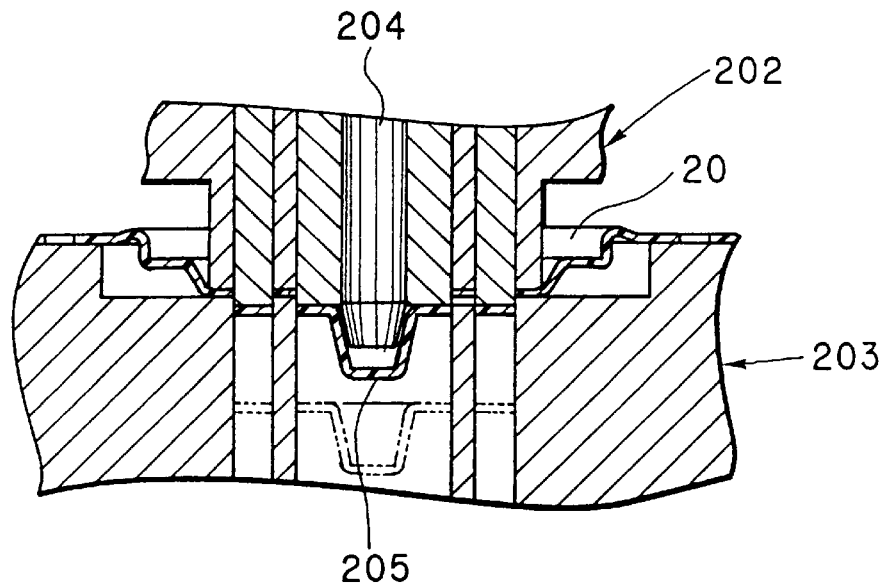

A bottom of the positioning pin 204 is protruded downwards further than the punch 202. As illustrated in FIG. 25B, the positioning pin 204 is first received in the positioning portion 181 when the punch 202 is lowered, to position the disk-like portions 20. Afterwards the bearing hole 17a and the slots 23 are cut. The bottom of the positioning pin 204 is provided with a conical face 204a in inclination associated with the conical face 181b of the positioning portion 181. The contact of the conical face 204a with the conical face 181b reliably guides the positioning portion 181. With the minute mobility of the disk-like portions 20 having the bend slits 199a and 199b, concentricity in treating the disk-like portions 20 between the vacuum/air-pressure forming and the punching is kept adequate. Scraps 205 formed by cutting the bearing hole 17a and the slots 23 are dropped through the die 203 to exit to the outside.

Figure 26A:
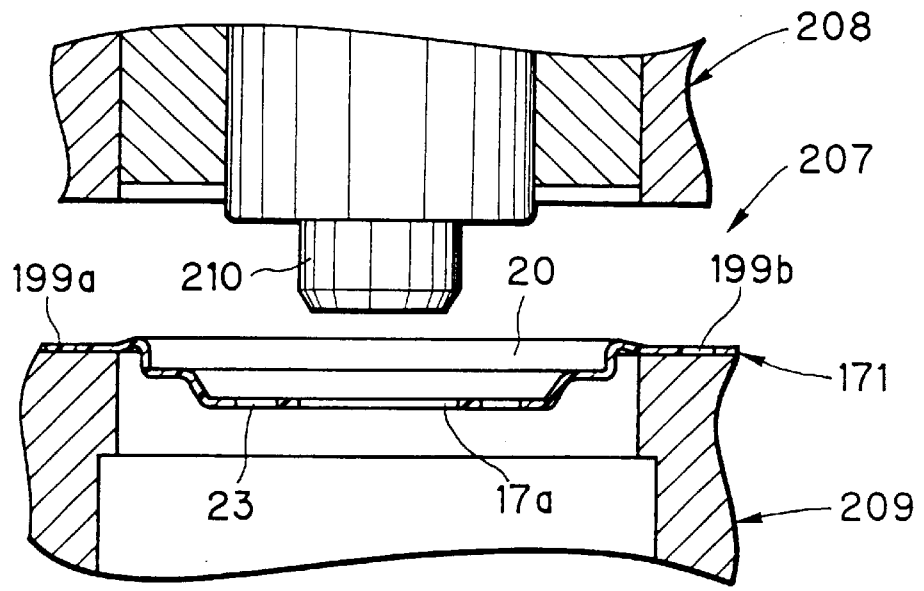
FIGS. 26A and 26B are sections illustrating operation of a second punching unit.

The continuous sheet 171 having the bearing hole 17a and the slots 23 is conveyed to a second punching unit 206. As illustrated in FIG. 26A, the second punching unit 206 has a punch/die set 207 for punching the contour of the disk-like portions 20 to cut out the disks 17. The punch/die set 207 includes a punch 208 above the continuous sheet 171 and a die 209 under the continuous sheet 171. The center of the punch 208 has a positioning pin 210, to be inserted in the bearing hole 17a to position the disk-like portions 20.

Figure 26B:
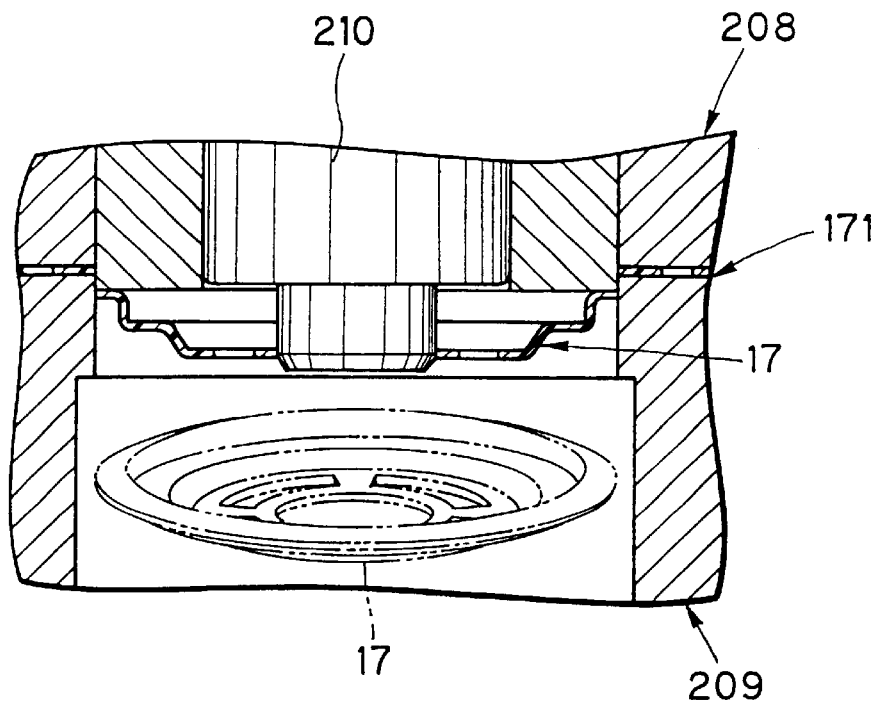

A bottom of the positioning pin 210 is protruded downwards further than the punch 208. As illustrated in FIG. 26B, the positioning pin 210 is first received in the bearing hole 17a when the punch 208 is lowered, to position the disk-like portions 20. Afterwards the disk contour is punched. When the positioning pin 210 is inserted in the bearing hole 17a, the disk-like portions 20 are minutely moved by the virtue of the bend slits 199a and 199b, so that concentricity in treating the disk-like portions 20 between the vacuum/air-pressure forming and the punching is kept ade quate.

The disks 17 are dropped under the die 209, and collected in a disk container. Note that the second punching unit 206 can be provided with a push back device, so that the disks 17 after being punched away can be returned to the continuous sheet 171 after the punching. For this structure, a disk withdrawing unit can be added downstream from the second punching unit 206 for withdrawing the disks 17 from the continuous sheet 171.

Referring to FIG. 19, in operation, an operating command is entered into the disk producing apparatus, which starts conveyance of the continuous sheet 171 from the sheet supply unit 165 to the sheet heating unit 167. In the sheet heating unit 167 as illustrated in FIGS. 20 and 21, the upper mask plate 168 of the mask device 170 is driven by the hydraulic cylinders, the air cylinders, the cams, and the like, is lowered along the guide shafts 173. The continuous sheet 171 is squeezed between the mask plates 168 and 169, and retained.

The portions of the continuous sheet 171 emerging through the greater openings 168a and 169a and the smaller openings 168b and 169b are heated by the sheet heaters 175 and 176 having the surface temperature of nearly 400° C. In the blocks 177 and 178, the distance from the regulating recesses 177a and 178a to the continuous sheet 171 is increased from each periphery of the portions to be heated toward each center of the portions. The center of each portion does not become any hotter than the periphery. With the sheet temperature regulated evenly, no distortion occurs in the disks. The continuous sheet 171 is heated as hot as 150° C. The mask plates 168 and 169 are being heated by the hot liquid medium, such as water or specialty oil, so that the masked portion of the continuous sheet 171 is heated to the temperature 10–50° C. lower than the softening point of the continuous sheet 171.

The continuous sheet 171 heated in the sheet heating unit 167 is conveyed to the forming unit 180, where heated portions of the continuous sheet 171 are contacted on a mold by the vacuum and/or the air-pressure, and forms the disk-like portions 20, the positioning portion 181 and the retainable portion 182 with high precision as illustrated in FIGS. 22A and 22B. The portions of the continuous sheet 171 required for the forming have been heated to the softening point. The other portion is heated 10–50° C. lower than the softening point, so that no wrinkles or breakage occurs in the continuous sheet 171.

In FIG. 23, the retainable portion 182 is inserted into the receiving recess 185a while the continuous sheet 171 is conveyed. The solenoid 191 causes the conveying pin 190 to extend downwards, and to enter the retainable portion 182. The inclined face 190a of the conveying pin 190 is contacted on the conical face 182b of the retainable portion 182, to position the retainable portion 182. The conveying pin 190 and the receiving recess 185a clamps the retainable portion 182.

When the retainable portion 182 is retained on the sheet clamp 185, the motor 189 is driven, to rotate the pulley 187a in the clockwise direction. The sheet clamp 185 is moved along the guide shaft 186 to the right as viewed in the drawing, with the continuous sheet 171 retained on the retainable portion 182. Once the sheet clamp 185 comes to the position indicated by the phantom lines, the sheet clamp 185 is stopped. The pressing pin 194 of the sheet retaining mechanism 192 is protruded by the solenoid 193 downwards, and squeezes the continuous sheet 171 between the rubber head 194a and the table 195, to hold the continuous sheet 171 as stopped.

The continuous sheet 171 provided with the disk-like portions 20, the positioning portion 181 and the retainable portion 182 is conveyed from the forming unit 180 to the slit punching unit 198, where the punch and the die form the bend slits 199a and 199b for the disk-like portions 20 as illustrated in FIGS. 24A and 24B. The scraps from the bend slits 199a and 199b are dropped through the die to exit.

The continuous sheet 171 after the slit punching is conveyed to the first punching unit 200 by the sheet conveyor 183. In the first punching unit 200, as illustrated in FIGS. 25A and 25B, the punch 202 is lowered by the hydraulic cylinders, the air cylinders, the cams, and the like. The positioning pin 204 is first inserted in the positioning portion 181. The contact of the conical face 204a with the conical face 181b guides the positioning portion 181. The disk-like portions 20 are positioned in well-centered fashion adjusted through the bridge portions 199c.

The punch 202 is further lowered, and cooperates with the die 203 to cut the bearing hole 17a and the slots 23 in the disk-like portions 20. The positioning of the positioning portion 181 with the positioning pin 204 is effective in raising concentricity between the forming of the ring-like lip 17b and the cutting of the bearing hole 17a and the slots 23. The scraps 205 created from the bearing hole 17a and the slots 23 are dropped through the die to exit.

The continuous sheet 171 in which the bearing hole 17a and the slots 23 are formed is conveyed to the second punching unit 206, where the punch 208 is lowered by the hydraulic cylinders, the air cylinders, the cams, and the like, as illustrated in FIGS. 26A and 26B. The positioning pin 210 is first inserted in the bearing hole 17a. The disk-like portions 20 are positioned in well-centered fashion adjusted through the bridge portions 199c.

The punch 208 is further lowered, and cooperates with the die 209 to cut the contour of the disk-like portions 20 to punch out the disks 17. The positioning of the bearing hole 17a with the positioning pin 210 is effective in raising concentricity between the disk contour and the bearing hole 17a. The disks 17 are dropped under the die 209, collected in the disk container, and conveyed to a line for assemblage of the spool 5.

In the above, the retainable portion and the positioning portion have respective recesses in which the pins are inserted for the retention and positioning. It is instead possible that a retainable portion and a positioning portion have respective projections, which may be retained and positioned by being inserted in respective recesses formed in a retaining device and a positioning device. Furthermore, it is possible not to form any additional positioning portion, but to use the ring-like lip of the disk-like portion as positioning portion, to be fitted on a positioning device shaped in association therewith.

In any of the above embodiments, only the disks 17 are produced. The disks 16 are produced separately from the disks 17. However the present invention is applicable for a disk producing apparatus in which the disks 16 and 17 are produced from the same continuous sheet at the same time.

Figure 27:
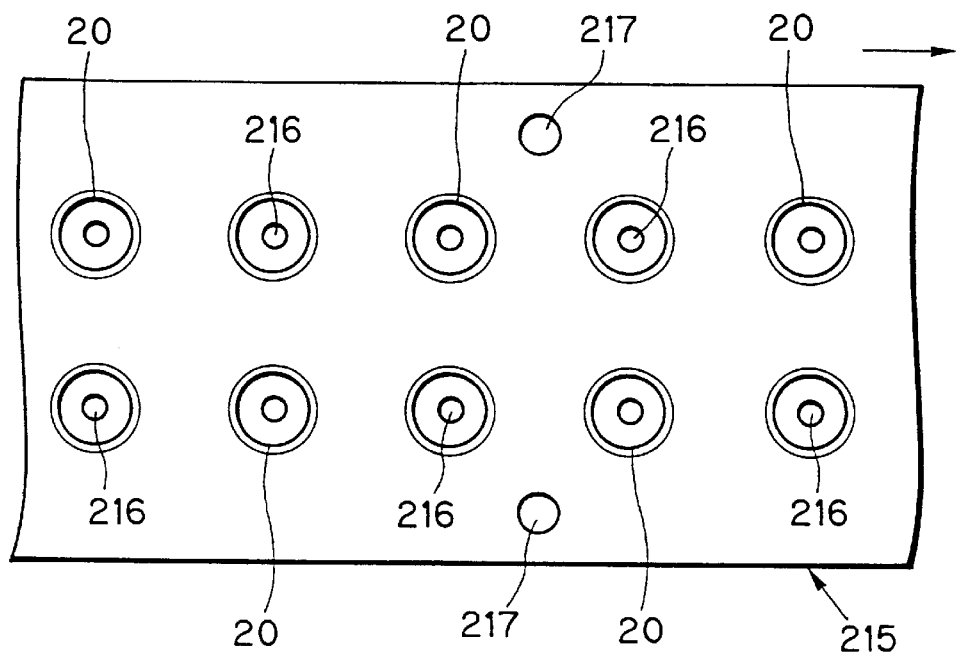
FIG. 27 is an explanatory view illustrating a sheet in which two lines of disk-like portions are formed.
Figure 28:
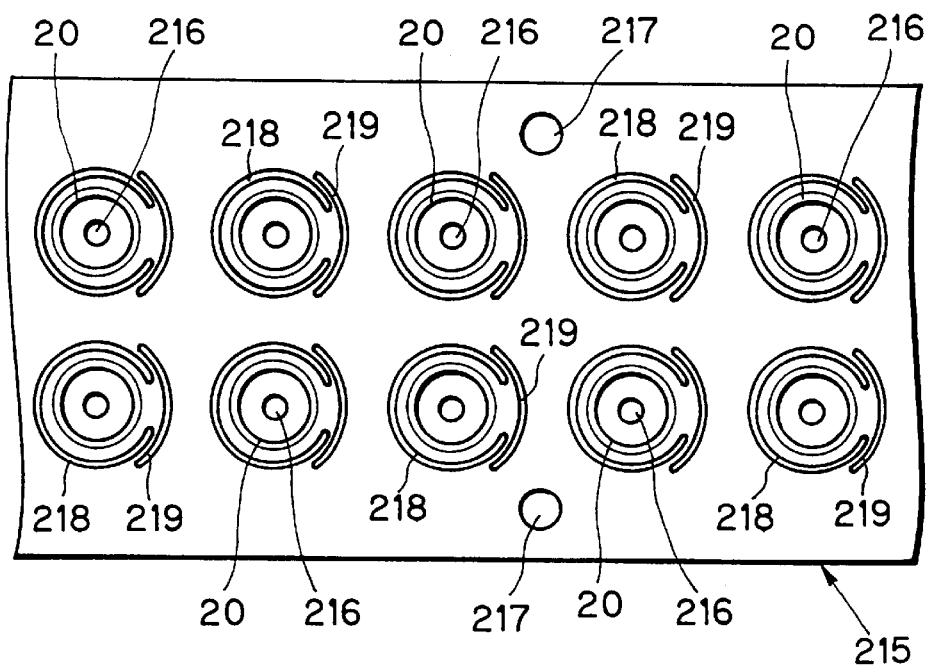
FIG. 28 is an explanatory view illustrating the sheet after the slit punching.

The embodiment is described as a variant of the foregoing embodiment. In FIG. 27, a continuous sheet 215 has a great width, and subjected to the vacuum/air-pressure forming to form 10 of the disk-like portions 20 in 2×5 matrix. The arrow indicates a direction of conveyance. To preheat the continuous sheet 215 before the forming, a mask plate having 10 openings is used. Positioning portions 216 and retaining portions 217 are formed at the same time as the disk-like portions 20. In a slit punching unit, as illustrated in FIG. 28, bend slits 218 and 219 in arcuate shapes are formed around the disk-like portions 20. All of the disk-like portions 20 have a common shape.

Figure 29:
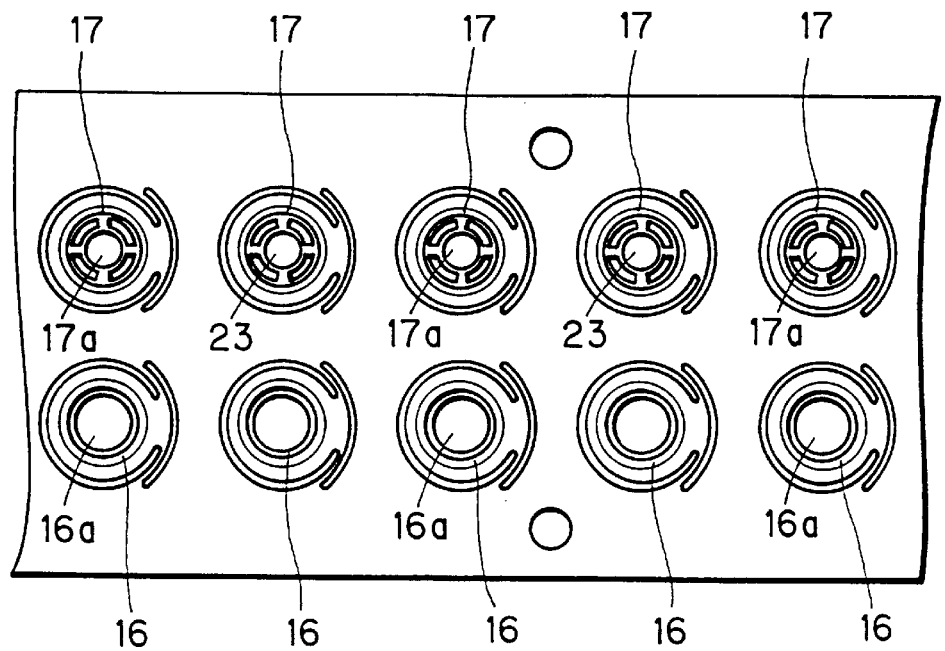
FIG. 29 is an explanatory view illustrating a sheet in which two kinds of disks are being produced.

In FIG. 29, the disk-like portions 20 are arranged in first and second lines. In the first punching unit, the bearing hole 17a and the slots 23 are cut in disk-like portions of the first line of the disk-like portions 20. The bearing hole 16a is cut in disk-like portions of the second line. In the second punching unit, the contour of all the disk-like portions 20 is cut, so that the disks 16 and 17 are produced. Note that, if the disks 16 and 17 as cut out are mixed up, they must be subsequently separated prior to the assembly of the spool 5. It is preferred that there are two separate exit stations respectively associated with the disks 16 and 17 as receptacles of the die.

Figure 30:
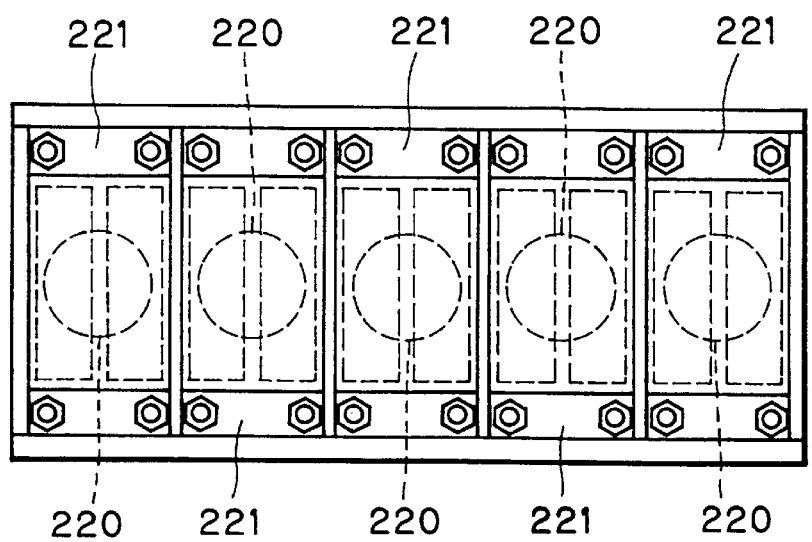
FIG. 30 is a plan illustrating a variant of sheet heater.

In the above, the single sheet heater is used for heating the plural portions to be the disk-like portions. However it is likely that there is unevenness in temperature between positions on the sheet heater. FIG. 30 illustrates an embodiment to solve this problem: plural sheet heaters 221 are disposed in positions associated with respective openings 220 in a mask plate, and individually controlled in temperature. This is effective in regularizing quality of disks.

In the above embodiments, each sheet heater includes the metal block and the cartridge heater incorporated in it. Instead, near infrared ray heaters, such as halogen lamp heaters, may be used.

Each set of a punch and a die used in the slit punching unit, the first punching unit and the second punching unit means at a faster rate the greater the number of the portions punched at the same time, and is costly when replaced by a new set. The present invention is applicable in a disk producing apparatus in which six disk-like portions are formed at one time, and then two or three of the disk-like portions are punched at one time. This can reduce the speed of the means of the sets of a punch and a die, and thus reduce the expenses for disk production.

In any of the above embodiments, the sheet is heated sufficiently at one time. Alternatively the sheet can be heated at a plurality of times successively, in view of evenness and high performance in the heating.

In the mold, the air passageway for air suction is formed. It is possible to eliminate the air passageway, and to form the mold from metal or ceramics having air permeability, so as to suck a sheet in regular fashion to regularizing quality of disks.

To inspect disks as produced, the disks must be aligned in conventional techniques. However the apparatus of the present invention makes it possible to inspect the disks before punching of their contour: after the punching of the hole and the openings, the disk-like portions can be inspected by means of image recognition as to their contour shape and opened positions. This makes it unnecessary to align the disk as produced, and can raise efficiency in production.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A disk producing apparatus for a photo film cassette including a spool core on which photo film is wound in a form of a roll, a cassette shell for containing said spool core in rotatable fashion, and a pair of disks in each of which a bearing hole is formed, and each of which is respectively secured to first and second ends of said spool core, for regulating edges of said photo film, said disk producing apparatus comprising:

a sheet supply unit for supplying a sheet of thermoplastic synthetic resin;

a mask device for partially masking said sheet, and at least one opening formed through said mask device;

a sheet heating unit for heating a portion of said sheet exposed through said mask device at a temperature higher than a softening point of said sheet, said sheet heating unit including a first heating member and a regulating recess formed in said first heating member, said regulating recess of said first heating member is confronted with said opening in said mask device, and is retracted most deeply at a position corresponding to a center of said opening;

a forming unit for subjecting said portion of said sheet exposed through of said mask to one of vacuum forming, air-pressure forming, and vacuum/air-pressure forming, so as to form a disk-shaped portion in said sheet;

wherein said sheet heating unit is operative to be moved from a first position which is outside said forming unit to a second position which is inside said forming unit;

a punching unit for cutting said bearing hole and a contour of said disks in said disk-shaped portion, to produce said disks; and a disk withdrawing unit for withdrawing said disks from said sheet.

2. A disk producing apparatus as defined in claim 1, wherein said forming and said punching units are operative to form ring-shaped lips on respective peripheries of said disks, projected toward said roll of said photo film, contacted on said edges of said roll, for preventing said roll from being loosened.

3. A disk producing apparatus as defined in claim 2, wherein said at least one opening formed through said mask device has a size which is greater than said disks, and said portion of said sheet exposed through said mask device is operative to be heated by said sheet heating unit.

4. A disk producing apparatus as defined in claim 3, further comprising a mask heating device for heating said mask device at temperature lower than said softening point of said sheet while said mask device masks said sheet partially.

5. A disk producing apparatus as defined in claim 4, wherein said mask heating device is operative to provide heat to said mask at a temperature 10–50° C. lower than said softening point of said sheet.

6. A disk producing apparatus as defined in claim 4, wherein said mask device includes first and second plates between which said sheet is squeezed, to avoid deforming said sheet.

7. A disk producing apparatus as defined in claim 6, wherein said at least one opening formed through said mask device is formed from:

at least one first opening formed through said first plate, said at least one first opening has a size greater than said disks, said portion of said sheet exposed through said mask device is operative to be heated by said sheet heating unit while said sheet is supported on said first plate; and at least one second opening formed through said second plate and substantially confronted with said first opening, said portion of said sheet exposed through said mask device is operative to be heated by said sheet heating unit while said sheet is supported on said second plate.

8. A disk producing apparatus as defined in claim 7, further comprising a ring-shaped projection formed on an edge of said first opening, projected toward said second plate, and received in said second opening when said first and second plates are contacted on each other, for positioning said sheet between said first and second plates in cooperation with said second opening.

9. A disk producing apparatus as defined in claim 6, wherein said sheet heating unit further includes:
  a second heating member opposed to said first heating member, and a regulating recess formed in said second heating member, said regulating recess of said second heating member is confronted with said opening in said mask device, and is retracted most deeply at a position corresponding to a center of said opening,
  wherein said regulating recess formed in said first heating member and said regulating recess formed in said second heating member are retracted most deeply at a position corresponding to a center of said opening for rendering a temperature of said sheet at said center substantially as high as a temperature of said sheet at a periphery of said opening.

10. A disk producing apparatus as defined in claim 4, wherein said at least one opening is single, and has a length substantially equal to a cumulative value of diameters of said disks.

11. A disk producing apparatus as defined in claim 4, wherein said at least one opening comprises a plurality which are arranged in a line.

12. A disk producing apparatus as defined in claim 11, wherein said plurality of said opening respectively have a length substantially twice as great as a diameter of said disks, and arranged in a longitudinal direction thereof.

13. A disk producing apparatus as defined in claim 11, wherein said sheet heating unit includes a plurality of sheet heating devices confronted respectively with said plurality of said openings.

14. A disk producing apparatus as defined in claim 4, wherein said sheet supply unit is operative to supply a continuous sheet which is conveyed in a substantially rectilinear fashion from said sheet supply unit, through said sheet heating unit, through said forming unit and toward said punching unit.

15. A disk producing apparatus as defined in claim 14, wherein said forming unit forms simultaneously N disk-shaped portions arranged in a direction of conveying said sheet, where N≧2; and
  said punching unit produces simultaneously N disks from said N disk-shaped portions.

16. A disk producing apparatus as defined in claim 14, wherein said forming unit forms simultaneously N disk-shaped portions arranged in a width direction of said sheet, where N≧2; and
  said punching unit produces simultaneously N disks from said N disk-shaped portions.

17. A disk producing apparatus as defined in claim 14, further comprising:
  a retainer-forming device, disposed in said forming unit, for forming a retainable portion in said sheet and near to an edge thereof when said forming unit forms said disk-shaped portion;
  a retaining device, disposed in a conveying path of said sheet, for retaining said retainable portion; and
  a conveying device, movable in one direction within a predetermined range, said retaining device being mounted on said conveying device, said conveying device moving said retaining device retaining said retainable portion, so as to convey said sheet intermittently.

18. A disk producing apparatus as defined in claim 17, further comprising:
  a positioner-forming device, disposed in said forming unit, for forming a positioning portion in said sheet in association respectively with said disk-shaped portion when said forming unit forms said disk-shaped portion; and
  a positioning device, disposed in said punching unit, for positioning said sheet with said positioning portion, in cutting said bearing hole and said contour of said disks.

19. A disk producing apparatus as defined in claim 18, wherein said retainable portion has a recess or a projection, and said positioning portion has a recess or a projection.

20. A disk producing apparatus as defined in claim 4, further comprising a slit cutting unit, disposed between said forming unit and said punching unit, for cutting at least one first bend slit in an outside of said disk-shaped portion to extend along part of a periphery thereof, said first bend slit rendering a position of said disk-shaped portion adjustable minutely relative to said sheet.

21. A disk producing apparatus as defined in claim 20, wherein said slit cutting unit further cuts a second bend slit in said sheet, said second bend slit being disposed near to an outside of said first bend slit, and said first and second bend slits surrounding said disk-shaped portion, for rendering flexible a portion of said sheet between said first and second bend slits.

22. A disk producing apparatus as defined in claim 21, wherein said slit cutting unit is operative to form said first bend slit to have a range over a half of said periphery of said disk-shaped portion, and said second bend slit to have a range under a half of said periphery of said disk-shaped portion.

23. A disk producing apparatus as defined in claim 4, wherein said forming unit forms first and second lines of disk-shaped portions, said first line is used for forming a first one of said disks, said second line is used for forming a second one of said disks, said first one has a first opening-cutting pattern, said second one has a second opening-cutting pattern different from said first opening-cutting pattern.

24. A disk producing apparatus as defined in claim 23, wherein said punching unit initially cuts said first opening-cutting pattern in said first line of said disk-shaped portions, and cuts said second opening-cutting pattern in said second line of said disk-shaped portions; and
  subsequently said punching unit cuts said contour of said first and second ones of said disks in said first and second lines of said disk-shaped portions.

25. A disk producing apparatus as defined in claim 24, further comprising a slit cutting unit, disposed between said forming unit and said punching unit, for cutting at least one first bend slit in an outside of said disk-shaped portion to extend along part of a periphery thereof, said first bend slit rendering a position of said disk-shaped portion adjustable minutely relative to said sheet.

26. A disk producing apparatus as defined in claim 4, wherein said sheet has a predetermined size;
  said sheet supply unit, said sheet heating unit, said forming unit and said punching unit are arranged along one arc; and
  further comprising an index table, disposed at a center of arrangement of said sheet supply unit, said sheet heating unit, said forming unit and said punching unit, said sheet being mounted on said index table, said index table being rotated intermittently, for passing said sheet through said sheet supply unit, said sheet heating unit, said forming unit and said punching unit.

27. A disk producing apparatus as defined in claim 26, wherein said mask device includes plural sheet holders, secured to said index table, arranged radially, for supporting said sheet and for masking said sheet partially;

said sheet supply unit supplying said sheet holders with said sheet;

further comprising:

a sheet cooling unit, arranged on a periphery of said index table and past said forming unit, for cooling said sheet after said forming unit; and a sheet exit unit, arranged on a periphery of said index table and past said punching unit, for exiting said sheet after cutting away said disks.

28. A disk producing apparatus as defined in claim 27, wherein said forming unit forms simultaneously N disk-shaped portions arranged in one line, where N≧2.

29. A disk producing apparatus as defined in claim 27, wherein said forming unit forms simultaneously plural disk-shaped portions arranged in a matrix.

30. A disk producing apparatus for a photo film cassette including: a spool core on which photo film is wound in a form of a roll, a cassette shell for containing said spool core in rotatable fashion, a pair of disks in each of which a bearing hole is formed, and each of which is respectively secured to first and second ends of said spool core, for regulating edges of said photo film; and ring-shaped lips formed respectively on a periphery of said disks integrally therewith, projected toward said roll of said photo film, contacted on said edges of said roll, for preventing said roll from being loosened, said disk producing apparatus comprising:

an index table rotatable intermittently;

a sheet supply unit arranged on a periphery of said index table, for supplying a sheet of thermoplastic synthetic resin of a predetermined size;

plural sheet holders, secured to said index table, arranged radially in rotatable fashion through a rotational orbit, for supporting said sheet supplied by said sheet supply unit and for masking said sheet partially, said sheet holders respectively having an upper mask with an opening and a lower mask with an opening, for respectively exposing a portion of said sheet;

a sheet heating unit, arranged in said rotational orbit of said sheet holders and past said sheet supply unit, said sheet heating unit having an upper heater head and a lower heater head for heating a portion of said sheet exposed through said sheet holders at a temperature higher than a softening point of said sheet, at least one of said upper heater head and said lower heater is operative to be respectively inserted into one of said upper mask opening and said lower mask opening;

a forming unit, arranged in said rotational orbit of said sheet holders and past said sheet heating unit, for subjecting said exposed portion to one of vacuum forming, air-pressure forming, and vacuum/air-pressure forming, so as to form a disk-shaped portion in said sheet;

a sheet cooling unit, arranged in said rotational orbit of said sheet holders and past said forming unit, for cooling said sheet after said forming unit;

a punching unit, arranged in said rotational orbit of said sheet holders and past said sheet cooling unit, for cutting said bearing hole and a contour of said disks in said disk-shaped portion, to produce said disks; and a sheet exit unit, arranged in said rotational orbit of said sheet holders and past said punching unit, for exiting said sheet after cutting away said disks.

* * * * *